United States Patent
Shimada et al.

[19]

[11] Patent Number: 6,155,227
[45] Date of Patent: Dec. 5, 2000

[54] CONTROL APPARATUS FOR A DIRECT INJECTION ENGINE AND CONTROL METHOD OF THE ENGINE

[75] Inventors: Kousaku Shimada; Takeshi Atago, both of Hitachinaka, Japan

[73] Assignee: Hitachi, Ltd., Tokyo, Japan

[21] Appl. No.: 09/199,578

[22] Filed: Nov. 25, 1998

[30] Foreign Application Priority Data

Nov. 25, 1997 [JP] Japan .................................. 9-322682

[51] Int. Cl.$^7$ .......................... F02B 17/00; F02D 41/14; F02M 25/07
[52] U.S. Cl. ........................................... 123/295; 123/698
[58] Field of Search .................... 123/295, 298, 123/299, 300, 305, 430, 698

[56] References Cited

U.S. PATENT DOCUMENTS 5,848,580  12/1998  Mashiki .................................. 123/295
5,979,396  11/1999  Yasuoka ................................. 123/295

FOREIGN PATENT DOCUMENTS 7-166916  6/1995  Japan .
8-114166  5/1996  Japan .

*Primary Examiner*—Tony M. Argenbright
*Attorney, Agent, or Firm*—Evenson, McKeown, Edwards & Lenahan, P.L.L.C.

[57] ABSTRACT

A control apparatus for an engine includes a burn mode determining unit for determining a stoichiometric burn mode or a lean burn mode, and a stratified charge burn mode or a homogeneous charge burn mode. A target A/F calculating unit calculates a target A/F according to the operational point of the engine and a phase lag filter changes the phase of said calculated target A/F. A first target A/F modifying unit modifies the target A/F whose phase is delayed, so that an unstable burn region is avoided and a second target A/F modifying unit further modifies the modified target A/F during a transitional period when the operation is switched so as to avoid the unstable region. A target A/F selecting unit selects one of the modified A/F modified by the first target A/F modifying unit and the target A/F modified by the second A/F modifying unit.

20 Claims, 21 Drawing Sheets

CONTROL APPARATUS FOR A DIRECT INJECTION ENGINE AND CONTROL METHOD OF THE ENGINE

BACKGROUND OF THE INVENTION

The present invention relates to an electrical engine control system to realize lean fuel burn in a direct injection engine, and especially to an engine control system in which unstable burn for a period in which exhaust gas remains after an exhaust gas recirculation (hereafter referred to as EGR) operation is stooped can be avoided by modifying a target air-to-fuel ratio (hereafter referred to as A/F) during a transitional state when switching the operation state from a burn state with EGR to that without EGR.

In a conventional direct injection engine, for example, as described in Japanese Patent Application Laid-Open Hei 7 - 166916, a switching operation between the idling operation and the off-idling operation, which corresponds to a stratified charge burn, is disclosed. This conventional technique decreases an injection amount by the amount corresponding to a decrease in the pumping-loss while intake air is increased if it is determined that the operation has been switched from idling to off-idling.

Although a switching operation between the off-idling operation in a homogeneous charge burn and the off-idling operation in the stratified lean burn is disclosed, a switching operation from the stratified charge burn with EGR capable of improving a fuel consumption to the homogeneous charge burn is not considered.

Generally, in the stratified lean burn, a high burn stability can be obtained in the EGR operation, and even if a high degree of EGR is performed, a burn stability can be secured, and fuel consumption can be further improved. On the other hand, in the homogeneous lean burn, because the stability of burn is degraded in the EGR operation, stable burn is maintained by operating the engine without EGR or with the low degree of EGR.

That is, the burn instability may occur because the exhaust remains yet just after the operation is switched from the stratified lean burn with EGR to the homogeneous lean burn without EGR.

SUMMARY OF THE INVENTION

The present invention has been achieved in consideration of the above described problem, and is aimed at realizing an engine control apparatus capable of securing the stability of burn even if the operation is switched from the burn mode with EGR to that without EGR.

The above object of the present invention is attained by providing a control apparatus for a direct injection engine, the control apparatus comprising:

an air intake amount measuring means for measuring the amount Qa of intake air taken into each cylinder; a engine rotational speed measuring means for measuring the rotational speed Ne of an engine; a base fuel injection amount calculating means for calculating a base fuel injection pulse width Tp for each cylinder by multiplying the value of the air intake amount Qa divided by the rotational speed Ne by a coefficient such that an air-to-fuel ratio (A/F) of a fuel charge in the cylinder is the stoichiometric ratio (A/F=14.7); a lean charge injection amount calculating means for calculating a lean injection pulse width in a lean burn by multiplying the base fuel injection pulse width Tp by the equivalence ratio of the stoichiometric A/F of 14.7 to a lean charge A/F corresponding to the lean injection pulse; a burn mode determining means for determining a stoichiometric burn mode or a lean burn mode, and a stratified charge burn mode or a homogeneous charge burn mode; a target A/F calculating means for calculating a target A/F according to the operational point of the engine; a phase lag filter for changing the target A/F; a first target A/F modifying means for modifying the target A/F so that a region of unstable burn is avoided; a second target A/F modifying means for modifying the modified target A/F in a transitional state occurring when the operation is switched to avoid the instability region, and a target A/F selecting means for selecting one of the modified A/F modified by the first target A/F modifying means and the one further modified by the second A/F modifying means.

In accordance with the above control apparatus for an direct injection engine, a stoichiometric or lean burn mode, and a stratified charge or homogeneous charge burn mode are determined by the a burn mode determining means based on the detected rotational speed and acceleration pedal position, and a target A/F based on the operational point of the engine which is defined by the rotational speed and the acceleration pedal position, is further calculated by the target A/F calculating means. Moreover, the target A/F is changed by the phase lag filter, and then modified by the first target A/F modifying means so that an region of unstable burn is avoided, and the modified target A/F is further modified by the second target A/F modifying means in a transitional state occurring when the operation is switched to avoid the instability region. Furthermore, one of the modified A/F's modified by the first or second target A/F modifying means is selected by the target A/F selecting means.

DETAILED DESCRIPTION OF THE EMBODIMENTS

Hereinafter, details of embodiments according to the present invention will be explained with reference to the drawings.

Figure 5:
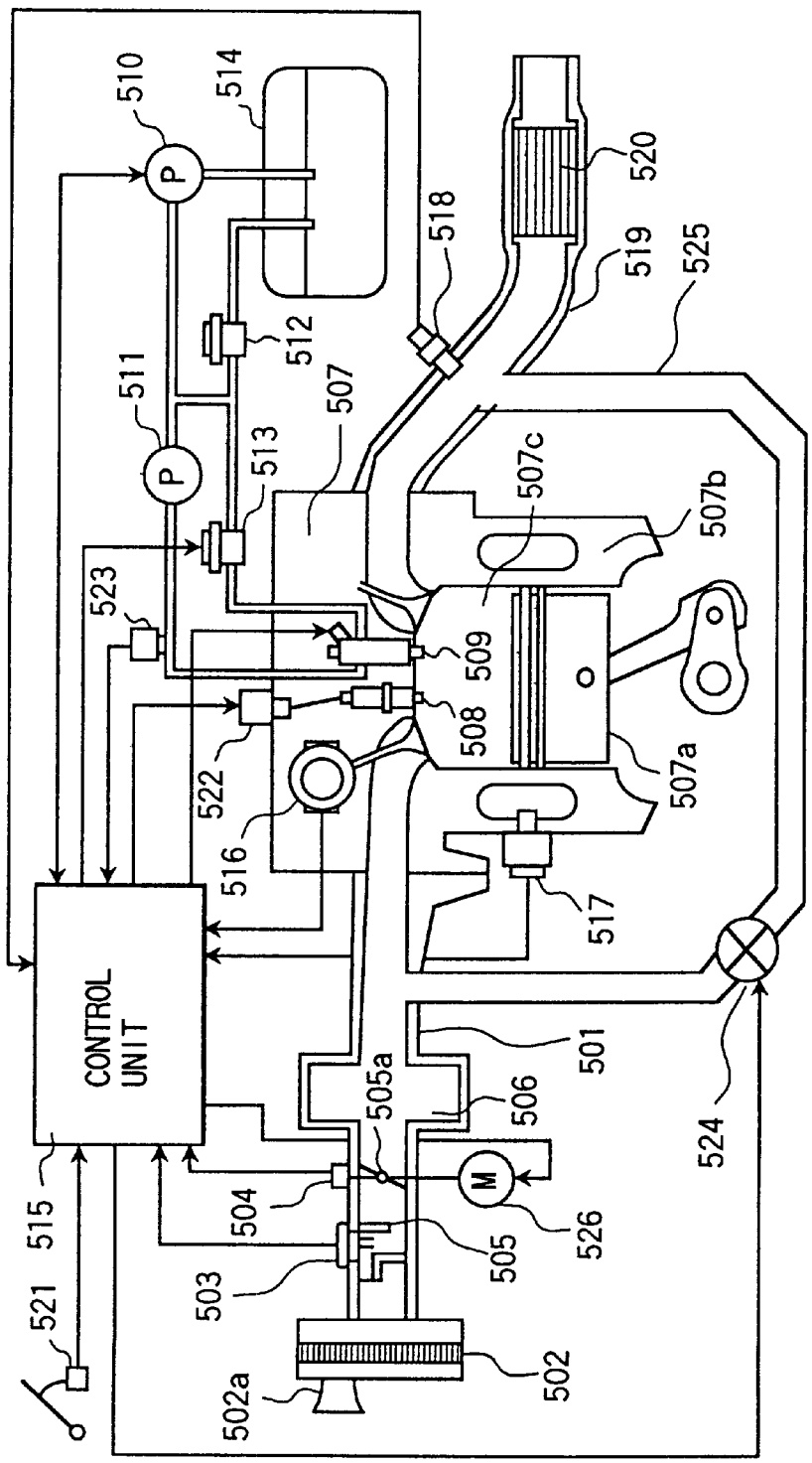
FIG. 5 shows an example of a schematic composition of a direct injection engine system.

To begin with, an example of an engine system to which the present invention is applied is shown in FIG. 5. Intake air in an engine 507 of the engine system is taken in from the inlet part 502a of an air cleaner 502, and enters a collector 506 via an air flow sensor 503 and a throttle body 505 including a throttle valve 505a for controlling intake air flow.

Moreover, the intake air is distributed to each air intake pipe connected to each cylinder in the engine 507, and taken into each cylinder. The throttle valve 505a is opened or closed by a motor 526.

On the other hand, fuel such as gasoline is fed from a fuel tank 514 and pressurized first by a fuel feed pump 510, and second further by a high pressure pump 511. Next, the fuel is fed into a fuel system in which injectors 509 are provided. The fuel pressurized first by the fuel feed pump 510 is regulated at a constant pressure (for example, 3 kg/cm$^2$) by a low pressure regulator 512, and the fuel regulated at the constant pressure is further regulated at a higher constant pressure (for example, 70 kg/cm$^2$) by a high pressure regulator 513. Lastly, the fuel is injected into each cylinder by each injector 509, and the injected fuel is then ignited with an ignition arc generated at the top of each ignition plug 508 whose voltage is greatly increased by an ignition coil 522.

Also, a signal indicating the flow rate of intake air is output from the air flow sensor 503, and is input to a control unit 515.

Furthermore, a throttle valve position sensor 504 for detecting the opening of the throttle valve 505a is attached to the throttle body 505, and an output signal of the throttle valve position sensor 504 is also input to the control unit 515.

Also, numeral 516 indicates a crank angle sensor for outputting both a reference angle signal REF indicating the position of a crank, and an angle signal POS used to detect the rotational speed; and the output signals are then input to the control unit 515.

Numerals 518 and 521 indicate an A/F sensor positioned in front of a catalyst device 520 provided in an exhaust pipe and an acceleration pedal sensor 521, respectively, and the output signals of these sensors are also input to the control unit 515.

Moreover, an EGR valve (EGR/V) 524 is used to control the recirculation flow rate of exhaust gas taken out of an exhaust pipe 519 and fed to the air intake pipe 501 via an EGR pipe 525, and its opening is decreased or increased by the control unit 515.

Figure 6:
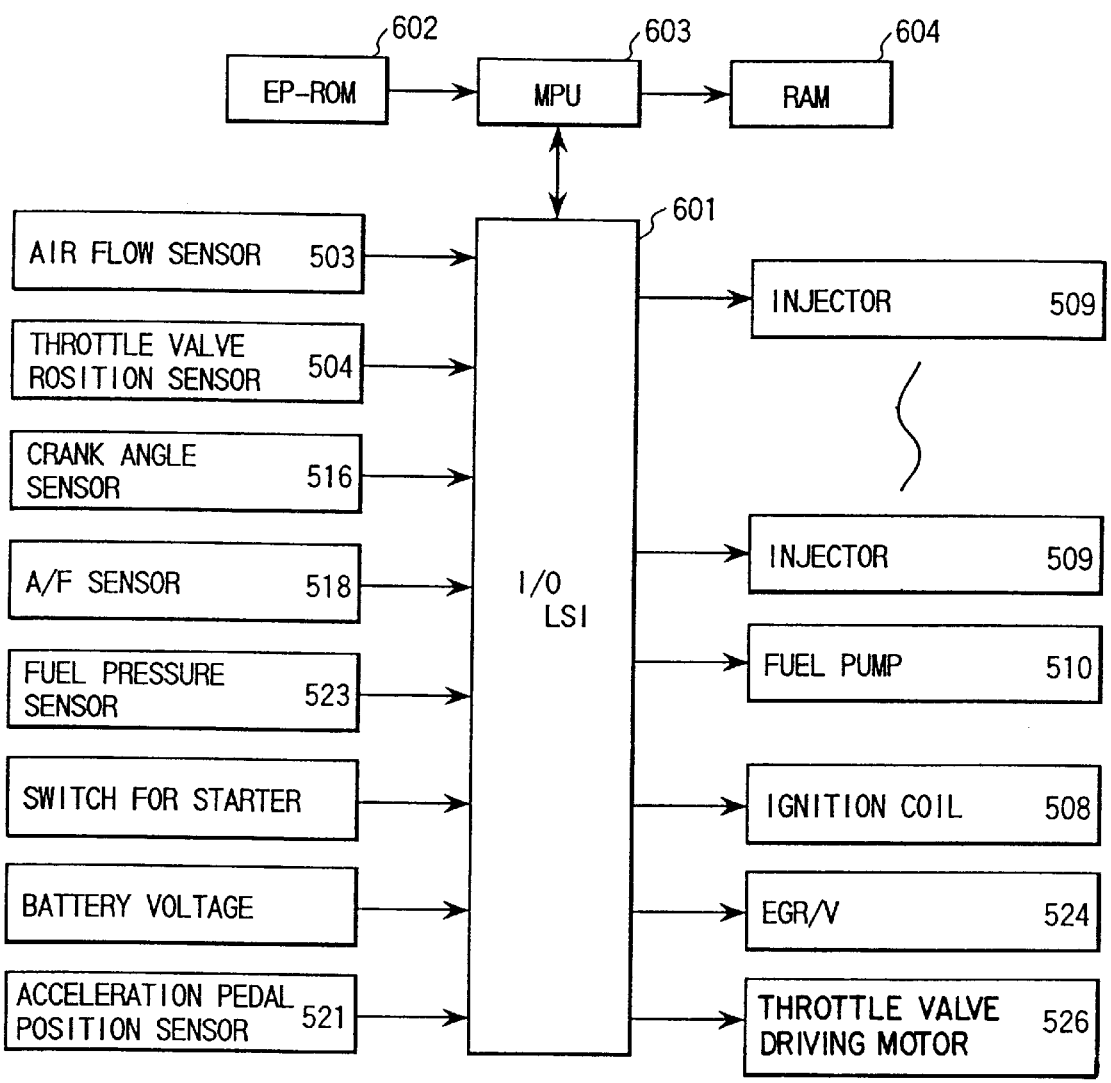
FIG. 6 shows a schematic block diagram of a control unit in the control apparatus for a direct injection engine according to the present invention.

The main section of the control unit 515 comprises a MPU, a ROM, a RAM, and an I/O LSI as shown in FIG. 6, and takes in signals output from the various sensors for detecting the operational conditions of the engine. Moreover, the predetermined processing is executed by this control unit 515, and results of the processing executed in the control unit 515 are output as control signals to the injectors 509 and the ignition coils 522 to control the fuel injection and the timing of ignition.

Figure 2:
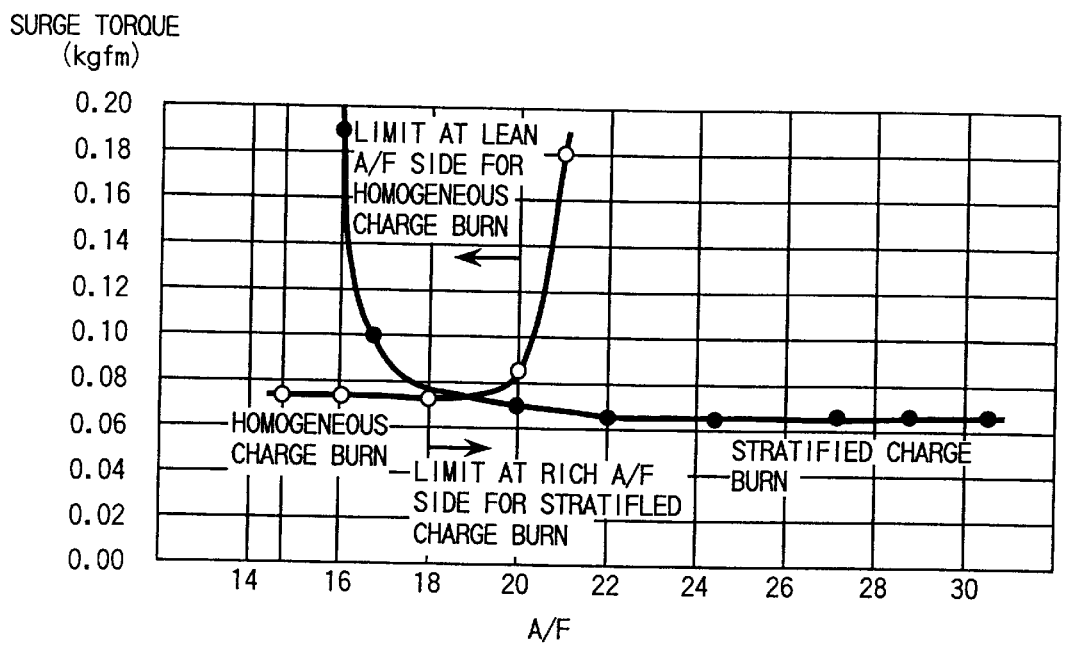
FIG. 2 shows an example of the burn characteristics in a lean burn and a homogeneous charge burn of an engine.
Figure 3:
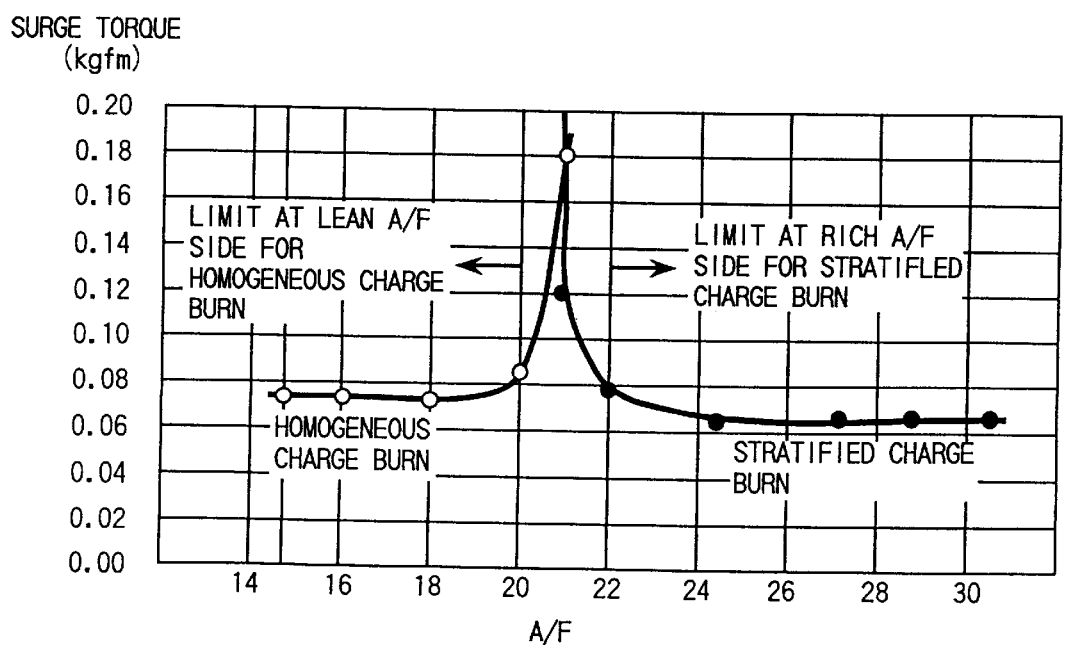
FIG. 3 shows another example of the burn characteristics in a lean burn and a homogeneous charge burn of an engine.

FIGS. 2 and 3 show two examples of A/F-limits in stable burn regions for the stratified charge and the homogeneous charge in the above-described direct injection engine. In the homogeneous charge burn, the burn stability deteriorates as the A/F increases, and in the stratified charge burn, the burn stability improves as the A/F decreases. In FIGS. 2 and 3, the burn stability is expressed with the surge torque index. Generally, the permitted limit of the surge torque in the burn stability is approximately 0.08–0.1 kgfm. In an engine possessing the burn characteristics shown in FIG. 2, the burn stability can be realized in the whole range of A/F by switching the burn mode between the stratified charge burn and the homogeneous charge burn in the A/F range of 18–20. On the other hand, in an engine indicating the burn characteristics shown in FIG. 3, there exists a burn instability region between the stratified charge burn and the homogeneous charge burn, and the engine must not be operated in this region in both the steady state and the transitional state.

Figure 7:
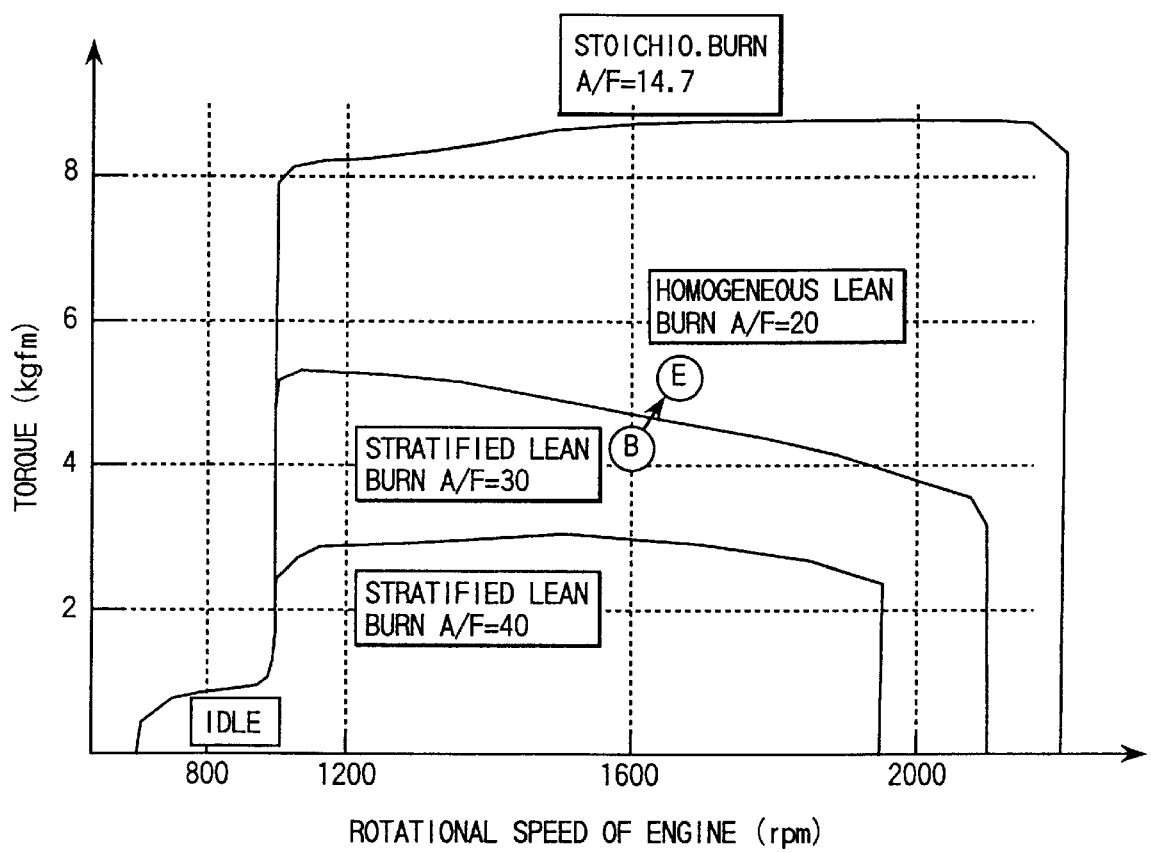
FIG. 7 shows an example of a map for setting a burn mode with respect to the parameter of the A/F.

FIG. 7 shows the region of each burn mode expressed in the operational point space and a target A/F of that region. The stratified lean burn mode is set in a region of a low rotational speed and a low load torque, and a target A/F is set to a lower value as the load torque increases. Here, when switching the burn mode in the of the unstable burn region shown in FIG. 3, the operational point transfers from point B to point E.

Although a method of reducing the pumping loss and the heat loss by recirculating exhaust gas can be applied to improve fuel consumption in the stratified charge burn, it is generally impossible to recirculate exhaust gas in the homogeneous lean burn because EGR greatly degrades the burn stability. Thus, to switch the burn mode between the stratified charge burn with EGR and the homogeneous charge burn without EGR, it is necessary that the A/F quickly transits the unstable region (A/F=20–22).

Figure 4:
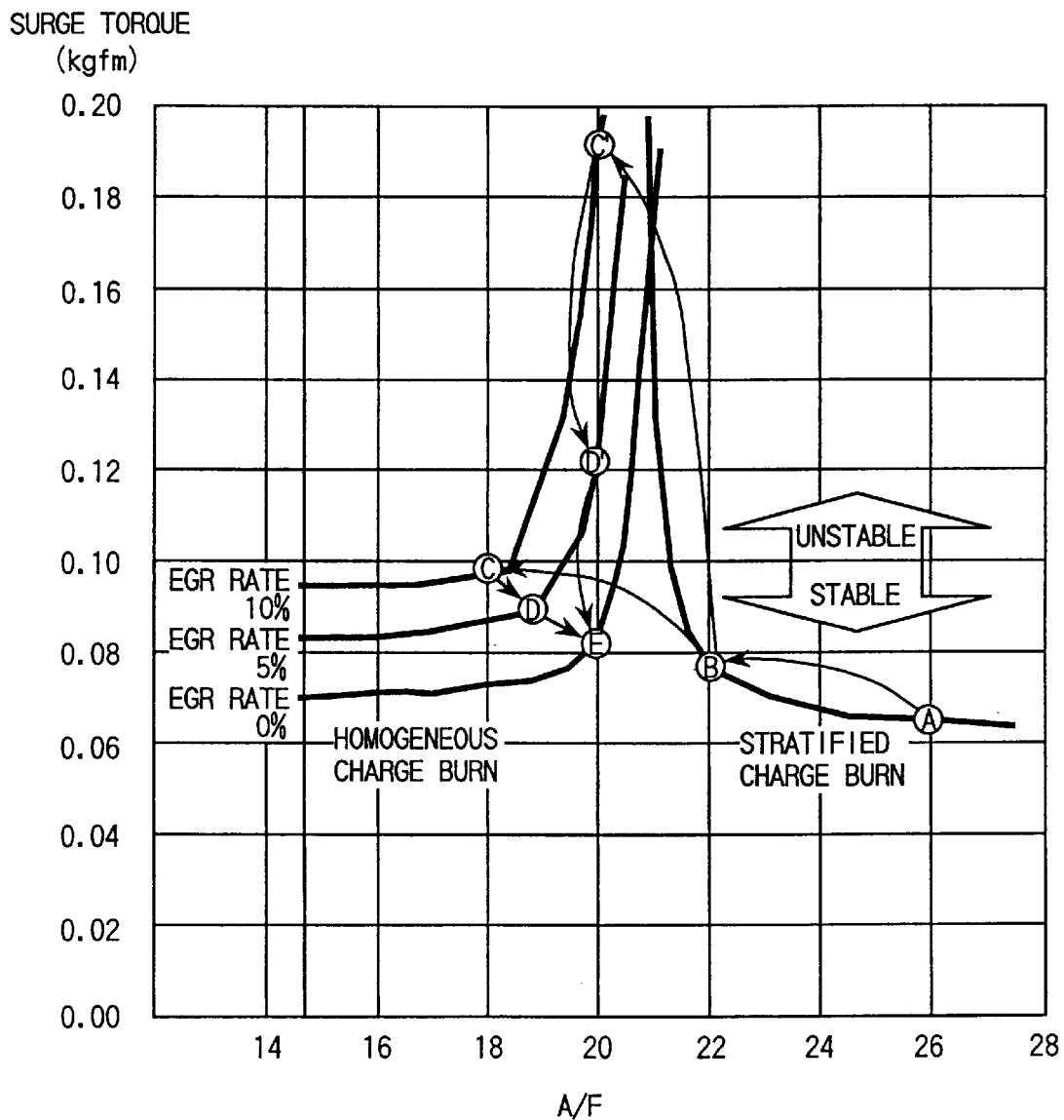
FIG. 4 shows the burn characteristics in a lean burn and a homogeneous charge burn of an engine when the rate of EGR is changed from the example shown in FIG. 3.

FIG. 4 shows trajectories of the transitional operation state in the surge torque-A/F space when the burn mode is switched by a conventional control apparatus and by the control apparatus of the present invention, respectively.

The operation is in an EGR operation state between points A and B in which the EGR/V 524 is opened. Here, although the burn mode is quickly switched from point B to point C' in a moment, and the EGR/V 524 is closed, the flow rate of EGR does not completely become 0 but gradually decreases from point C' to point D'. The surge torque is large and the burn is unstable until the flow rate of EGR decreases to point E.

It is possible to avoid the burn instability in the transitional state during the burn mode switching operation by controlling the engine so that the operation state follows the trajectory from point B to point E via point C and point D. Although point C and point C' are on the of 10% EGR rate line because points C and C' are in the operation point at the same time, the surge torque at point C is suppressed to lower than that at point C' because the A/F at point C is smaller than that at point C'. Similarly, the burn at point D is more stable than that at point D' because the A/F at point D is shifted in the stable direction.

In the following, a method of stably switching the burn mode along with the trajectory of point A→point B→point C→point D→point E will be explained.

Figure 1:
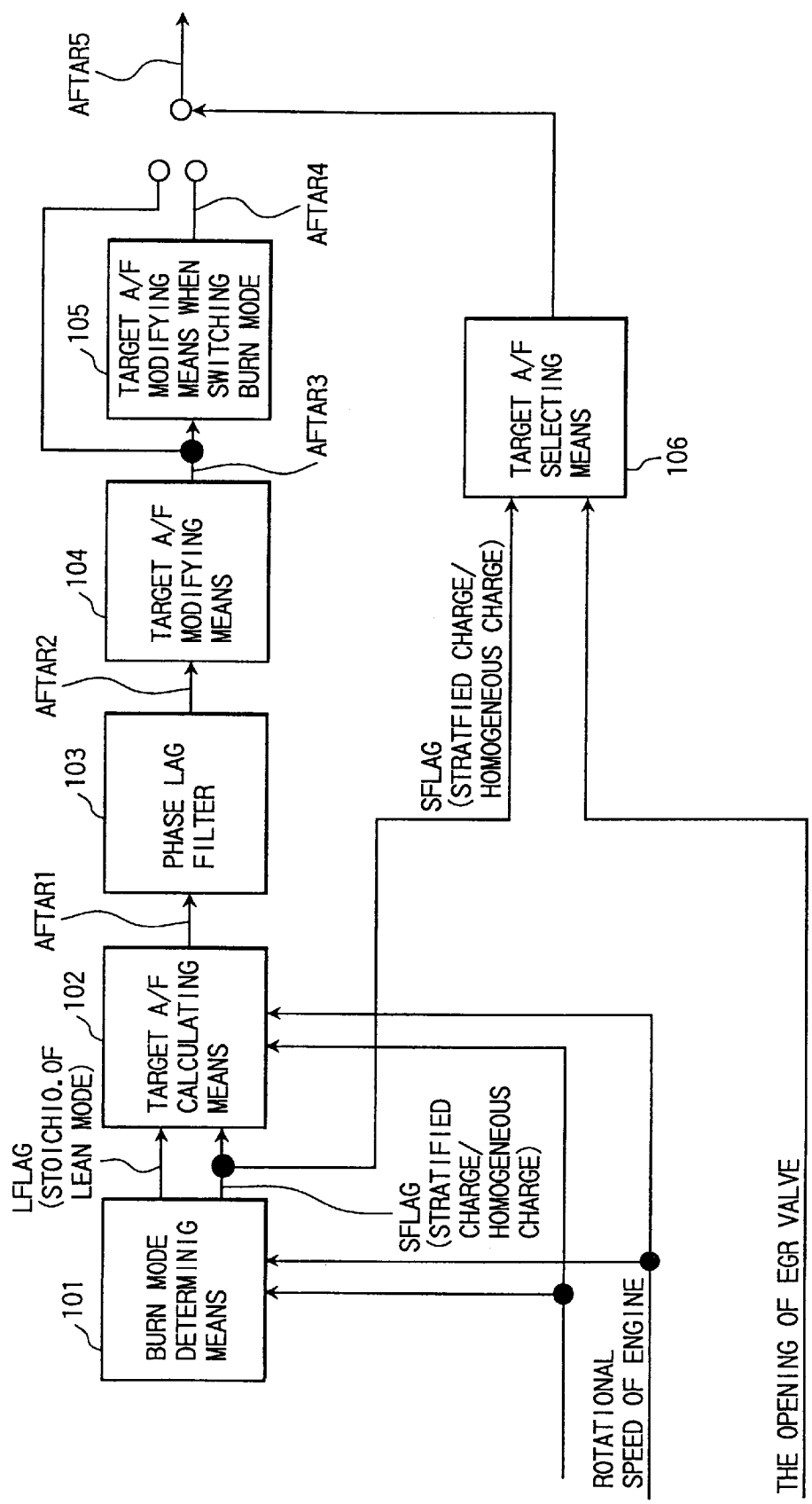
FIG. 1 is a schematic block diagram of a control apparatus for a direct injection engine of an embodiment according to the present invention.

FIG. 1 shows a schematic block diagram of controls for realizing the above-mentioned method of stably switching the burn mode, and the controls shown in this block diagram are executed by the control unit 515.

In a burn mode determining means 101, a stoichiometric burn mode or a lean burn mode, and a stratified charge burn mode or a homogeneous charge burn mode is determined by the based on the detected rotational speed and acceleration pedal position, and a flag LFLAG is output. In a target A/F calculating means 102, a target A/F (AFTAR1) according to the operational point of the engine which is defined by the rotational speed and acceleration pedal position is further calculated. Moreover, in a phase lag filter 103, the phase of the target A/F is delayed to match the phase of air to that of fuel, and the delayed target A/F (AFTAR2) is output. Afterward, in a first target A/F modifying means 104, the delayed target A/F is modified with a limiter function so that the region of unstable burn shown in FIG. 3 is avoided, and the modified A/F (AFTAR3) is output. Moreover, in a second target A/F modifying means 105 (target A/F modifying means when switching the burn mode), the modified target A/F (AFTAR3) is further modified with a limiter function in the transitional state occurring when the operation is switched from the burn with EGR to that without EGR so that the inhibitive burn region shown in FIG. 3 is avoided, and the further modified A/F (AFTAR4) is output. Furthermore, in the target A/F selecting means, one of the modified A/F (AFTAR3) output from the first target A/F modifying means 104 and the further modified A/F (AFTAR4) output from the second A/F modifying means 105 is selected according to the operation state when this selection is performed. After this selection, the final target A/F (AFTAR5) is obtained.

In the following, each control block shown in FIG. 1 will be explained.

Figure 8:
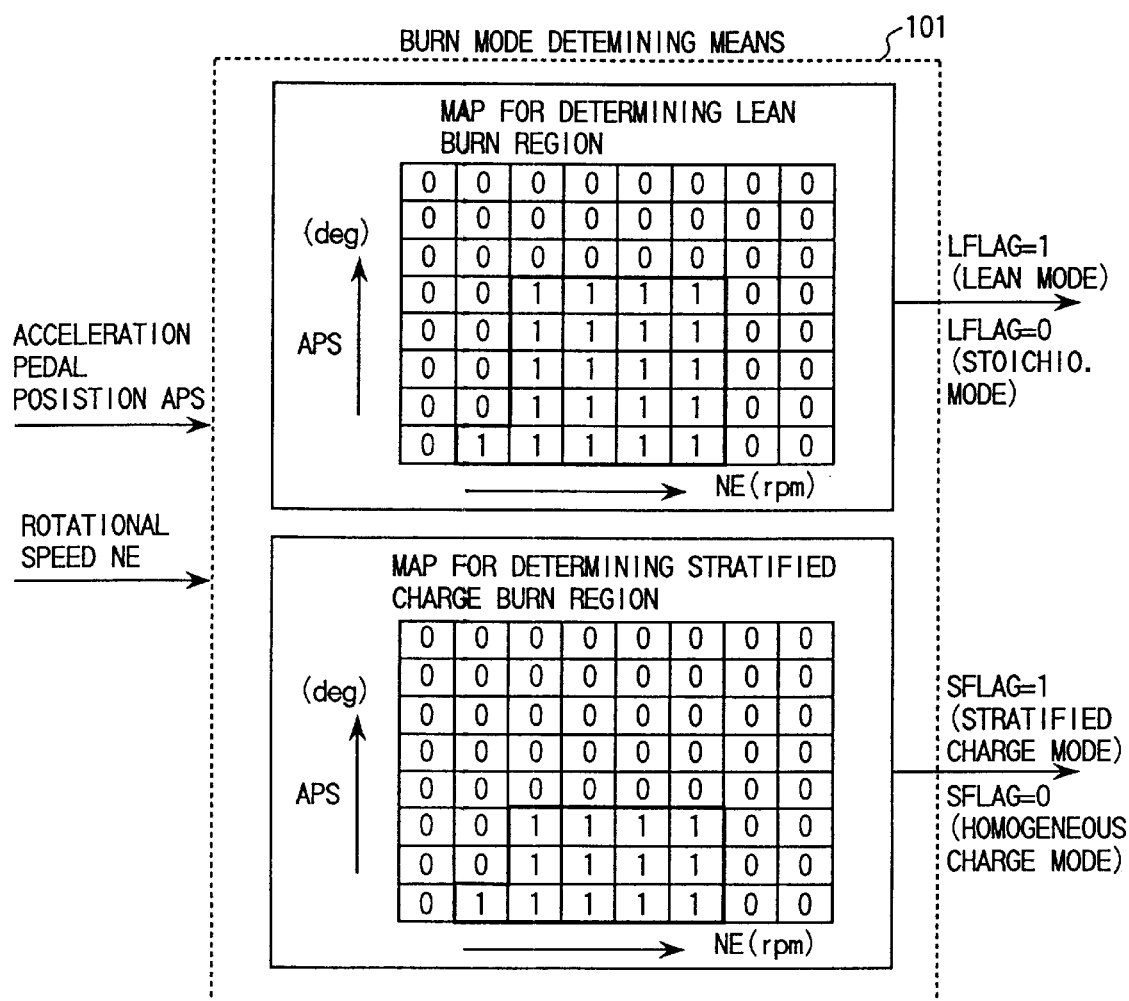
FIG. 8 is a block diagram showing a method of determining a burn mode executed by a burn mode determining means.
Figure 9:
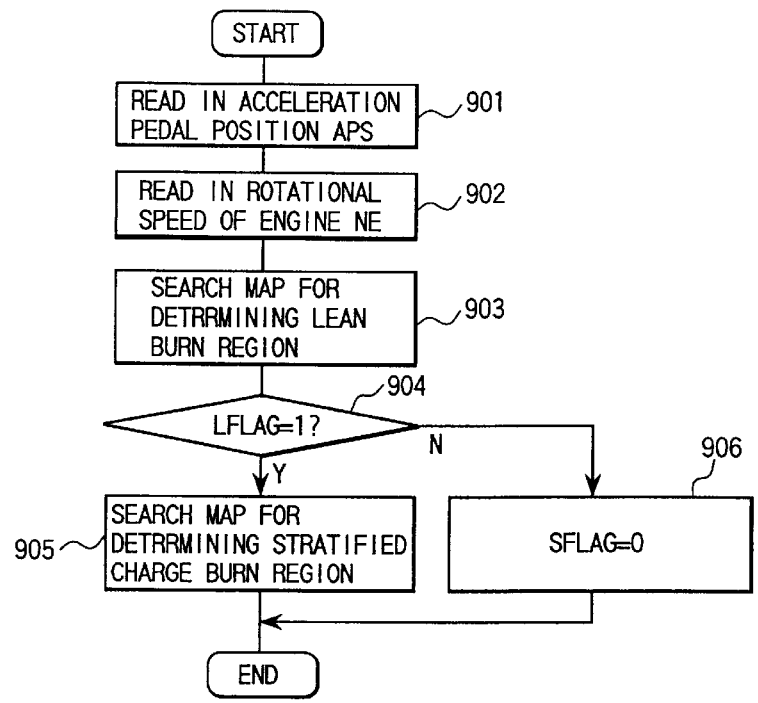
FIG. 9 is a flow chart showing a method of determining a burn mode executed by the burn mode determining means.

FIG. 8 shows details of the burn mode determining means 101. This means 101 reads in the acceleration pedal position APS and the rotational speed Ne of the engine, and determines whether the burn mode should be the lean burn mode or the stoichiometric burn mode by using a map for determining the lean burn region in the upper portion of FIG. 8. If it is determined that the burn mode should be the lean burn mode, the lean flag LFLAG is set to "1," otherwise, the lean flag LFLAG is set to "0." Furthermore, if it is determined that the burn mode should be the lean burn mode, it is also determined whether the burn mode should be the stratified lean burn or the homogeneous lean burn by using a map for determining the lean burn region in the lower side of FIG. 8. If it is determined that the burn mode should be the stratified lean burn, a stratified lean charge flag SLAG is set to "1," otherwise, the lean flag LFLAG is set to "0."

FIG., 9 is a flow chart showing the processing to implement the control executed by the burn mode determining means 101 shown in FIG. 8. In step 901, the acceleration pedal position APS is read in, and in step 902, the rotational speed NE of the engine is read in. In step 903, the map for determining the lean burn region is searched, and LFLAG is set, and in step 904, it is determined whether or not LFLAG is "1." If LFLAG is "1," the processing goes to step 905. Moreover, the map for determining the stratified charge burn region is searched, and SLAG is set.

In step 904, if the result of the determination is "NO", it is determined that the burn mode should be obviously the stoichiometric burn mode, and in step 906, "0" is set to SLAG.

Figure 10:
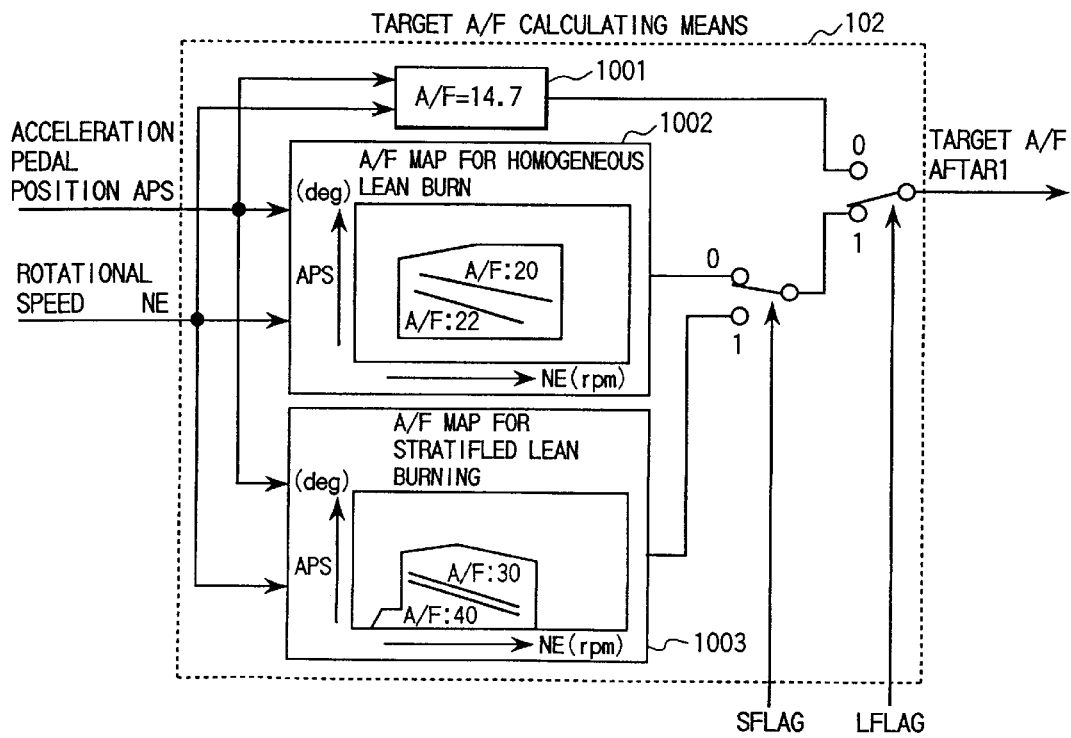
FIG. 10 is a block diagram showing a method of calculating a target A/F executed by a target A/F calculating means.

FIG. 10 shows details of the target A/F calculating means 102. If LFLAG is "0"; that is, if the burn mode is the stoichiometric burn mode, the constant value 14.7 is output as the target A/F by a block 1001. If the burn mode is the homogeneous lean burn, the target A/F is obtained by searching an A/F map for the homogeneous lean burn based on the acceleration pedal position APS and rotational speed NE read in by a block 1002. On the other hand, if the burn mode is the stratified lean burn, the target A/F is obtained by searching an A/F map for the stratified lean burn based on the acceleration pedal position APS and rotational speed NE read in by a block 1003. The target A/F obtained as mentioned above is output as AFTAR1.

Figure 11:
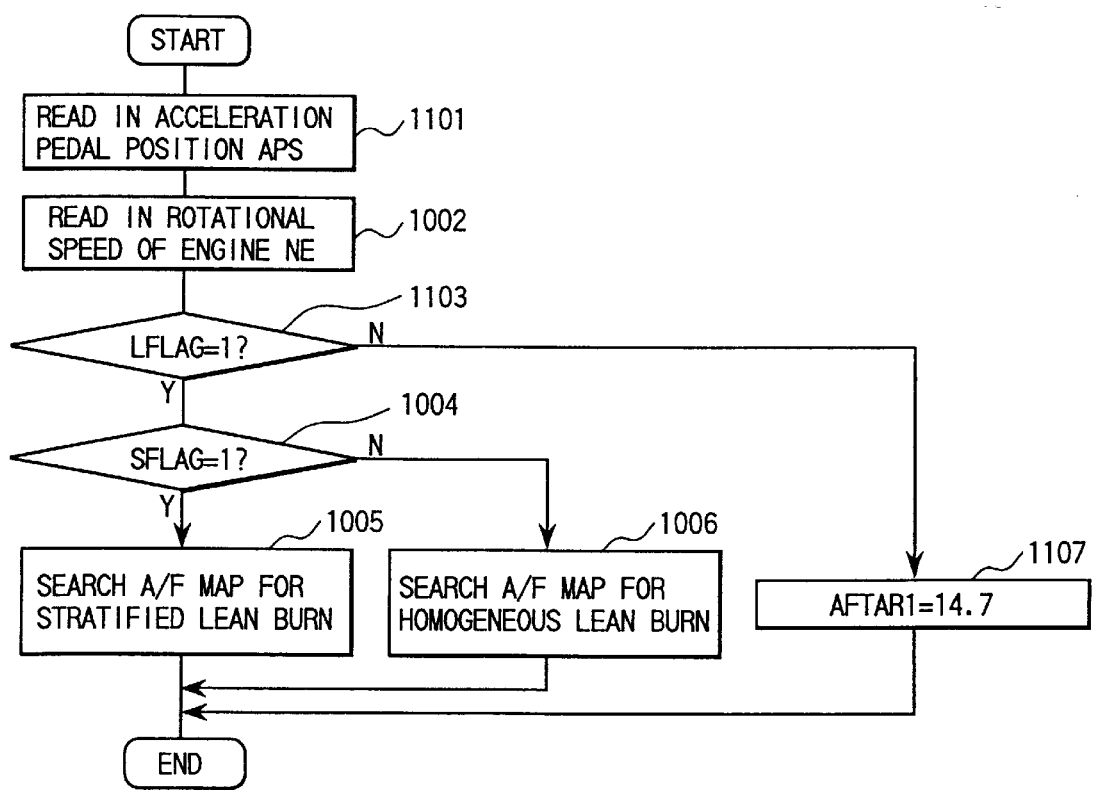
FIG. 11 is a flow chart showing a method of calculating a target A/F executed by the target A/F calculating means.

FIG. 11 is a flow chart showing the processing to implement the control executed by the target A/F calculation means 101 shown in FIG. 10. In step 1101, the acceleration pedal position APS is read in, and in step 1102, the rotational speed NE of the engine is read in. In step 1103, it is determined whether or not LFLAG is "0"; that is, whether the burn mode is the stoichiometric or lean burn mode. If it is determined that the burn mode is the lean burn mode, the processing goes to step 1104, and it is determined whether or not SLAG is "1." That is, it is determined whether the lean burn mode is the homogeneous lean burn or the stratified lean burn. If it is determined that the lean burn mode is the stratified lean burn, the processing goes to step 1105, and the A/F map for the stratified lean burn is searched to obtain the target A/F. In step 1104, if it is determined that the lean burn mode is the homogeneous lean burn, the processing goes to step 1106, and the A/F map for the homogeneous lean burn is searched to obtain the target A/F. On the other hand, if it is determined in step 1103 that the burn mode is the stoichiometric burn mode, the constant value of 14.7 is set to the target A/F in step 1107.

The phase lag filter 103 is explained below with reference to the block diagram shown in FIG. 12.

Figure 12:
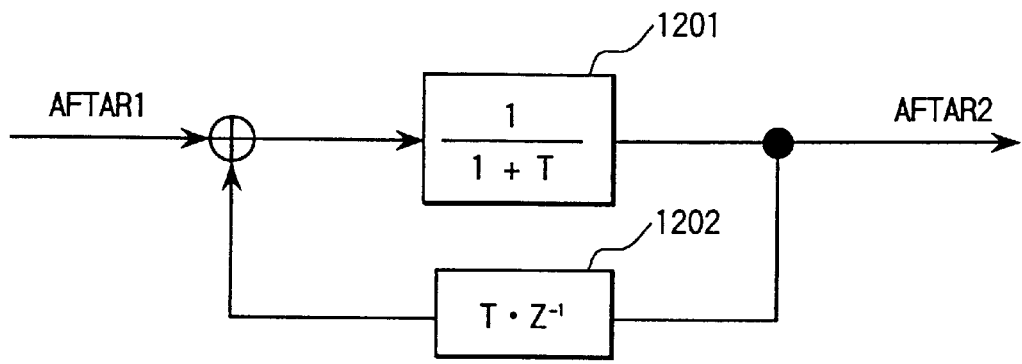
FIG. 12 is a schematic diagram of a phase lag filter.

In the example shown in FIG. 12, although the filter 103 performs the first-order lag operation for the inputted AFTAR1 and outputs AFTAR2, it is possible to perform a higher-order lag or a combination of a lag and dead time.

Figure 13:
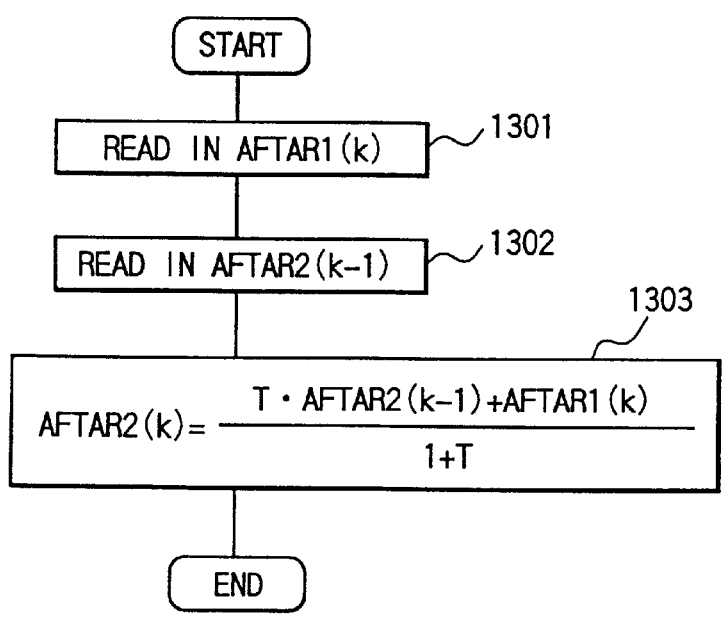
FIG. 13 shows a flow chart of the operations of the phase lag filter.

FIG. 13 is a flow chart showing the processing of the phase lag filter 103 shown in FIG. 12, and this processing is executed by the control unit 515.

In step 1301, AFTAR1 (K) of the present value of AFTAR1 is read in, and in step 1302, AFTAR2 (K−1) of the value of AFTAR1, which was output in the previous step, is read in. Afterward, in step 1303, AFTAR2 (K) is obtained and reset by using the equation shown there. This reset value of AFTAR2 (K) is sent to the next block of the target A/F modifying means 104, and is processed.

Figure 14:
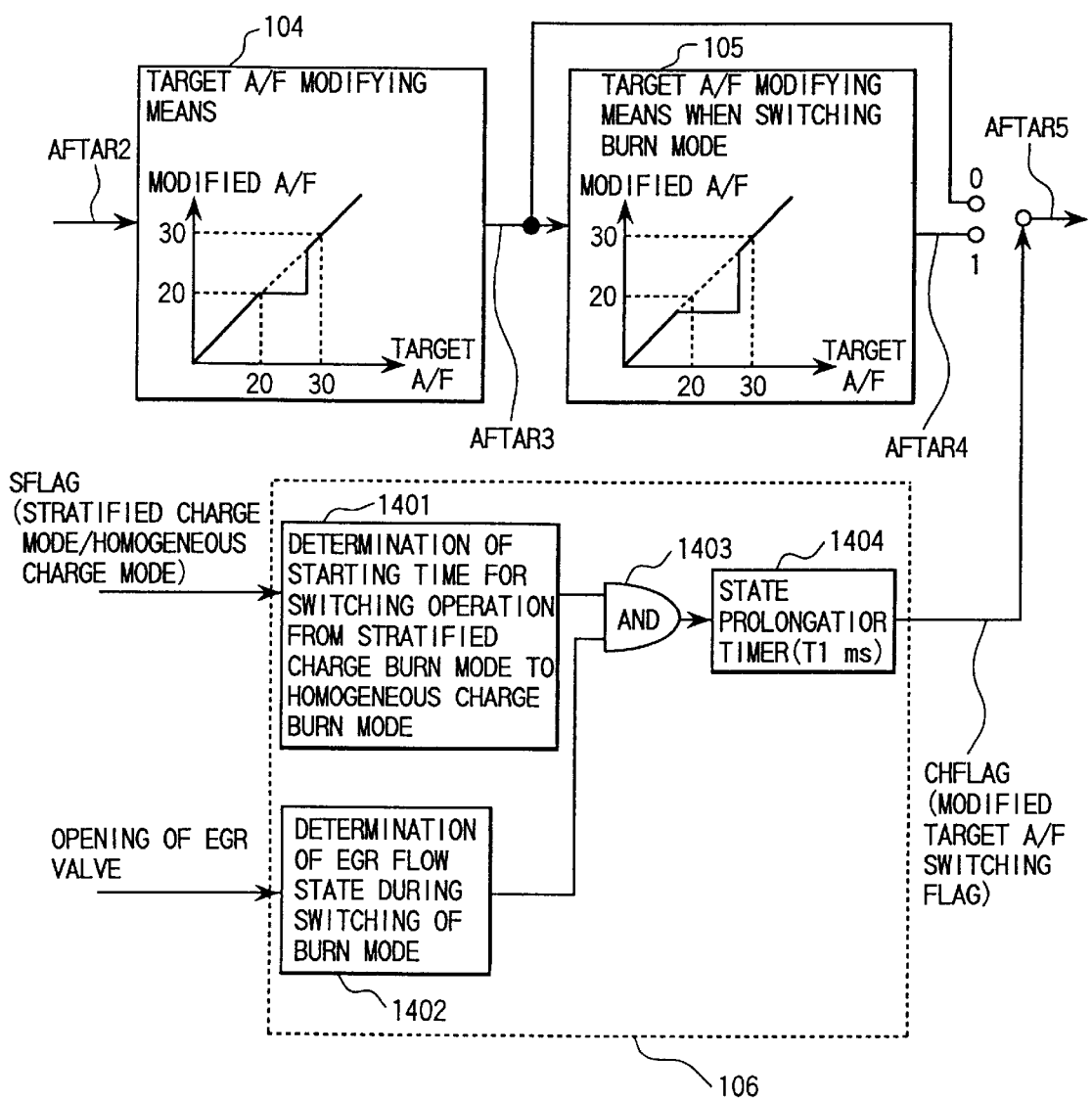
FIG. 14 is a block diagram showing a method of modifying a target A/F, which is executed by a first target A/F modifying means, a method of modifying the target A/F modified by the first target A/F modifying means, which is executed by a second A/F modifying means in burn mode switching operations, and a method of selecting one of these two modified target A/F, which is executed by a target A/F selecting means.

FIG. 14 shows details of blocks for the target A/F modifying means 104, the target A/F modifying means 105 when switching the burn mode, and the target A/F selecting means 106 together.

The block for the target A/F modifying means 104 functions as a limiter to hold the value of the A/F input to this block to a constant value in the predetermined interval. Although the composition and function of the block for the target A/F modifying means 105 when switching the burn mode is those of the block for the target A/F modifying means 104, d, the predetermined interval in this block for the target A/F modifying means 105 is different from that in the block for the target A/F modifying means 104 because the block for the target A/F modifying means 105 is used only when the burn mode is switched.

The block for the target A/F selecting means 106 is composed of a unit 1401 for determining the start of switching the burn mode between the stratified charge burn and the homogeneous charge burn, a unit 1402 for determining the EGR flow state when switching the burn mode, and an AND calculation unit 1403, and a state prolongation timer 1404. The unit 1401 determines whether or not the burn mode has been switched between the stratified charge burn and the homogeneous charge burn based on SFLAG. If the burn mode has been switched, the unit 1402 reads in the opening of EGR/V and monitors the EGR flow state when the burnmode is switched. Furthermore, if the flow rate of the EGR is more than a predetermined value, "1" is sent to the AND calculation unit 1403. Here, the state prolongation timer 1404 is a timer for outputting "1" during the predetermined period from the time when the output of the AND calculation unit 1403 indicates "1". The output of this timer 1404 is used as a modified target A/F switching flag CHFLAG, and this flag has the value of 1 during the predetermined period from the time when the burn mode is switched from the stratified charge burn with EGR to the homogeneous charge burn. Furthermore, if CHFLAG is "1", AFTAR4 is selected as the final target A/F AFTAR5, otherwise AFTAR3 is selected as the final target A/F AFTAR5.

Figure 15:
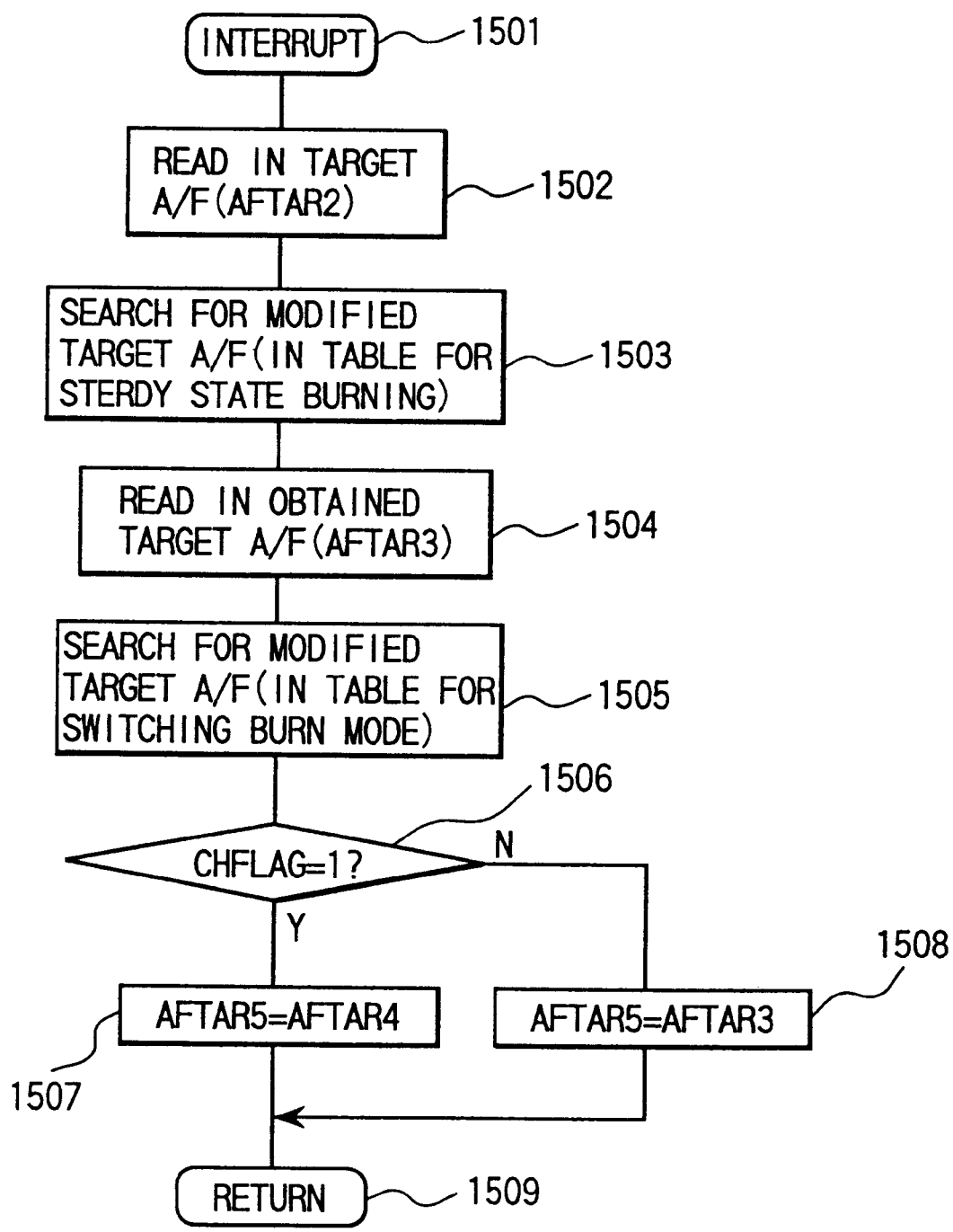
FIG. 15 is a flow chart showing the processing of the first target A/F modifying means and the second A/F modifying means in the burn mode switching operations.

FIG. 15 shows a flow chart showing the processing executed by the blocks for the target A/F modifying means 104, the target A/F modifying means 105 when switching the burn mode, and the target A/F selecting means 106.

Firstly, in step 1502, the input AFTAR2 is read in, and in step 1503, the table for the modified target A/F is searched. Consequently, the searched-for and obtained target A/F is read in as AFTAR3 in step 1504, and in step 1505, the table for the modified target A/F when switching the burn mode is searched. Afterward, in step 1506, it is determined whether or not CHFLAG is "1." If CHFLAG is "1"; that is, if the burn mode has been switched from the stratified charge burn with EGR to the homogeneous charge burn, AFTAR4 is selected as the final target A/F AFTAR5. Conversely, If CHFLAG is "1"; that is, if the burn mode has been switched from the stratified charge burn with EGR to the homogeneous charge burn, AFTAR4 is selected as the final target A/F AFTAR5.

Also, the processing executed by the state prolongation timer 1404 and the processing to generate CHFLAG are explained below with reference to the flow chart shown in FIG. 16.

To begin with, in step 1602, it is determined whether CHTIME (K) is positive or not. If the result of the determination is "NO," CHTIME (K) is set to the value of 0 in step 1605, and the value of 0 is further set to CHFLAG in step 1606. Conversely, if the result of the determination is "YES," the subtraction for CHTIME is executed in step 1603, and the value of 1 is further set to CHFLAG in step 1604. Afterward, whether or not SFLAG (K−1) is "1," whether or not SFLAG (K) is "0," and whether the opening of EGR/v is larger than the predetermined value S1 are determined in steps 1607, 1608, and 1610, respectively. If all the results of these three determination indicate "YES," the state prolongation time T1 is set to CHTIME (K). The determinations of steps 1607 and 1608 are executed to confirm that the burn mode was the stratified charge burn in the previous time step and the burn mode has been changed to the homogeneous charge burn in the present time step.

Figure 16:
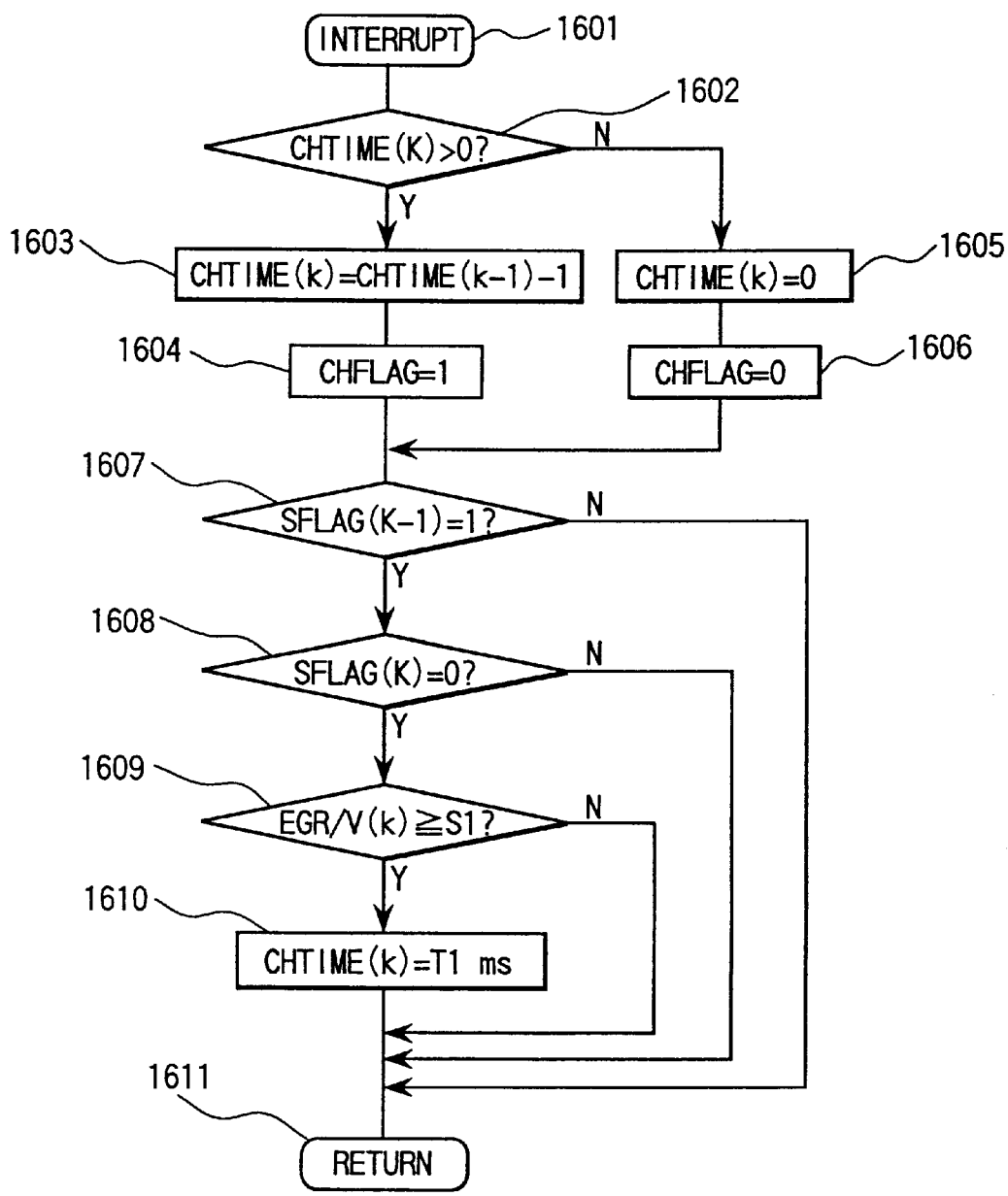
FIG. 16 is a flow chart showing the processing of the target A/F selecting means.

Here, the state prolongation time T1 is constant independent of the operational state when switching the burn mode in the embodiment shown in FIGS. 14–16. However, the time for which the EGR flow remains when switching the burn mode from the stratified lean burn with EGR to the homogeneous lean burn without EGR depends on the operational state, for example, of the engine. Accordingly, other examples of the composition of the block for the target A/F selecting means 106 in which the state prolongation time T1 is optimally set according to the operational state of the engine are shown in FIGS. 17 and 18.

Figure 17:
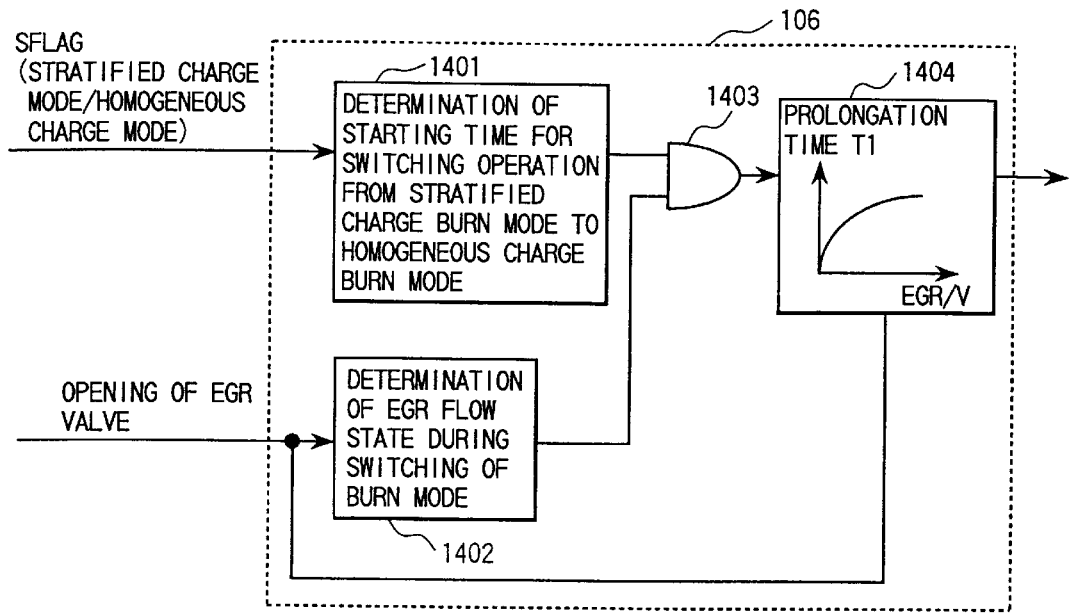
FIG. 17 shows the target A/F selecting means of another embodiment.

In the state prolongation time setting means 1404 shown in FIG. 17, the state prolongation time T1 is given by a function of the opening of EGR/V when switching the burn mode, in which the larger the opening of EGR/V when switching the burn mode is, the longer time is set to the time T1.

Figure 18:
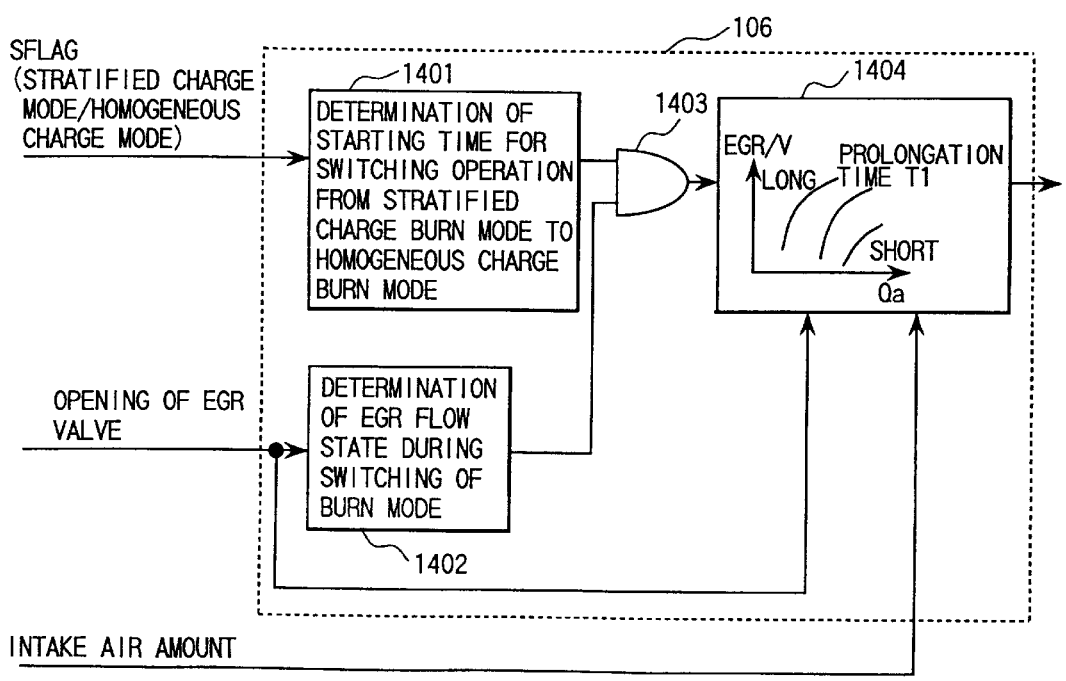
FIG. 18 shows the target A/F selecting means of still another embodiment.

On the other hand, in the state prolongation time setting means 1404 shown in FIG. 18, the state prolongation time T1 is given by a function of the opening of EGR/V and the amount Qa of intake air when switching the burn mode, in which the larger the opening of EGR/V is when switching the burn mode, and the smaller the Qa is, the longer time is set to the time T1.

Figure 19:
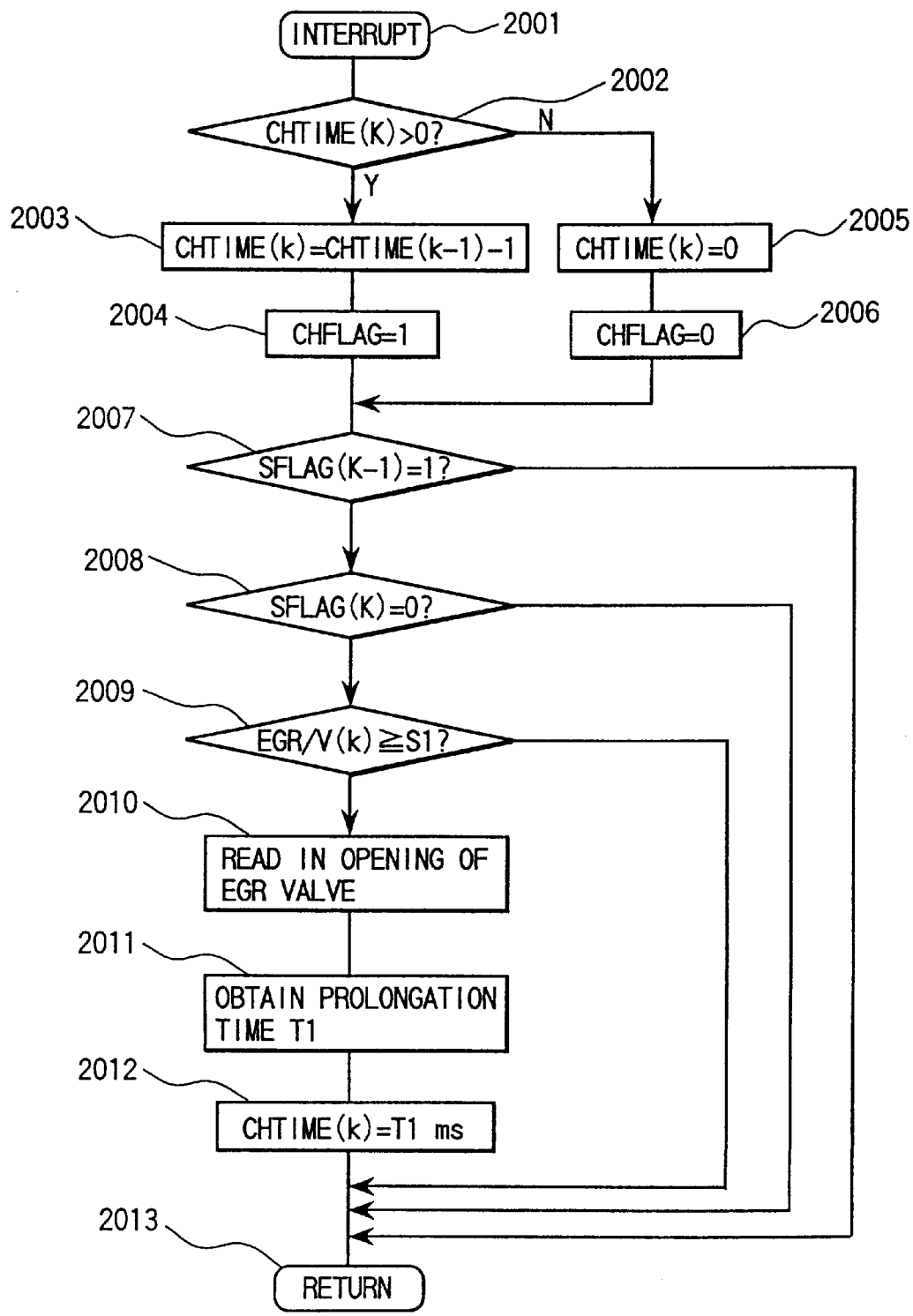
FIG. 19 is a flow chart showing the processing of the target A/F selecting means shown in FIG. 17.

FIG. 19 is a flow chart showing the processing executed by the state prolongation time setting means 1404 shown in FIG. 17, and processes different from those of the flow chart shown in FIG. 16 are steps 2010 to 2012. In step 2010, the opening of EGR/V is read in, and in step 2011, a table expressing the function of the opening of EGR/V is searched to obtain the time T1. Afterward, in step 2012, the obtained time T1 is set to CHTIME (K).

Figure 20:
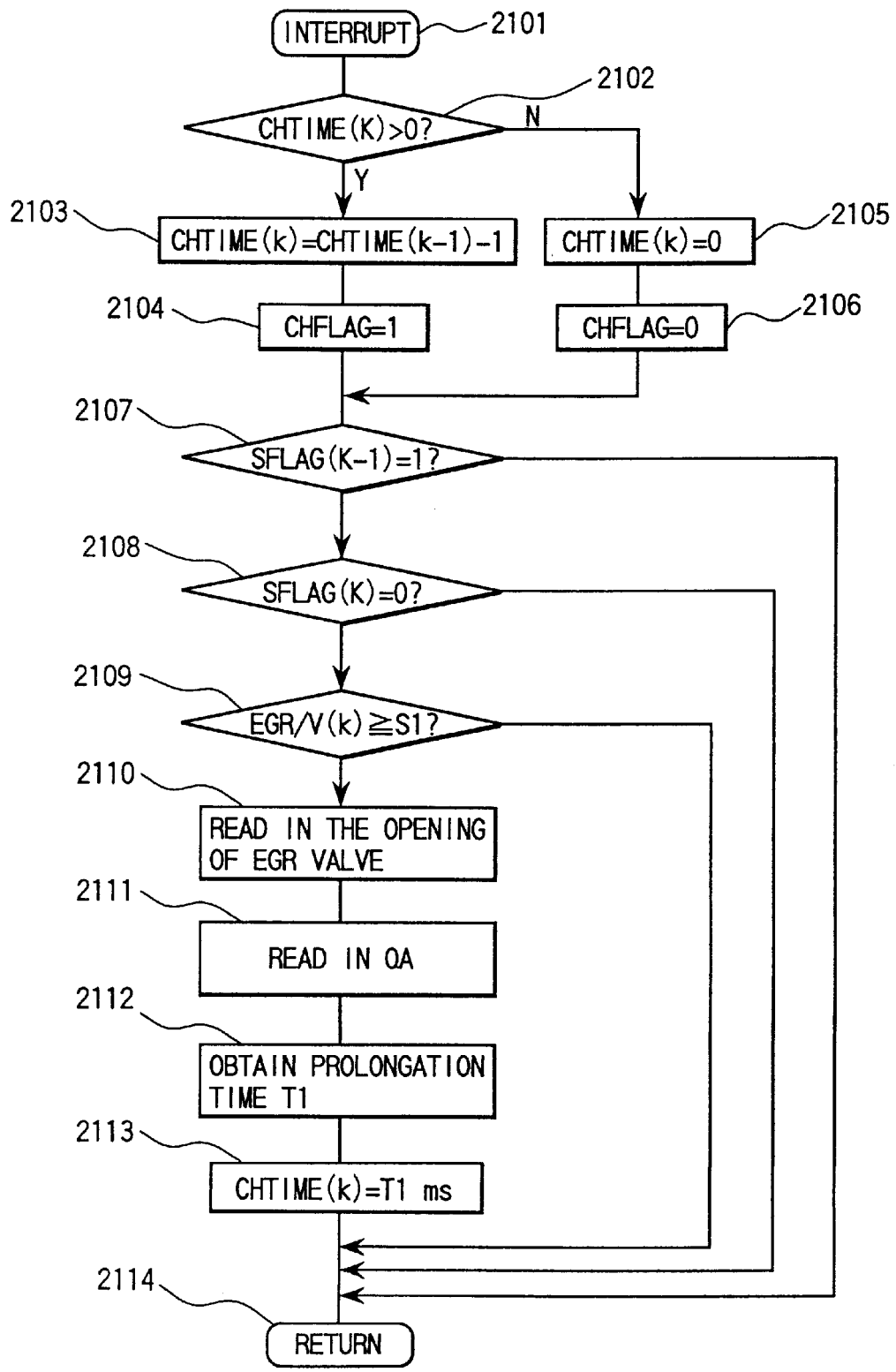
FIG. 20 is a flow chart showing the processing of the target A/F selecting means shown in FIG. 18.

FIG. 20 is a flow chart showing the processing executed by the state prolongation time setting means 1404 shown in FIG. 18, and processes different from those of the flow chart shown in FIG. 16 are steps 2110 to 2113. In step 2110, the opening of EGR/V is read in, and in step 2111, the amount Qa of intake air is read in. In step 2112, a table expressing the function of the opening of EGR/V and the amount Qa of intake air is searched to obtain the time T1. Afterward, in step 2113, the obtained time T1 is set to CHTIME (K).

In FIGS. 21–25, examples of the performance of the control apparatus for a direct injection engine when the burn mode switching operation is carried out are shown while the performance of a conventional control apparatus is also shown for comparison with that of the control apparatus of the present invention.

Figure 21:
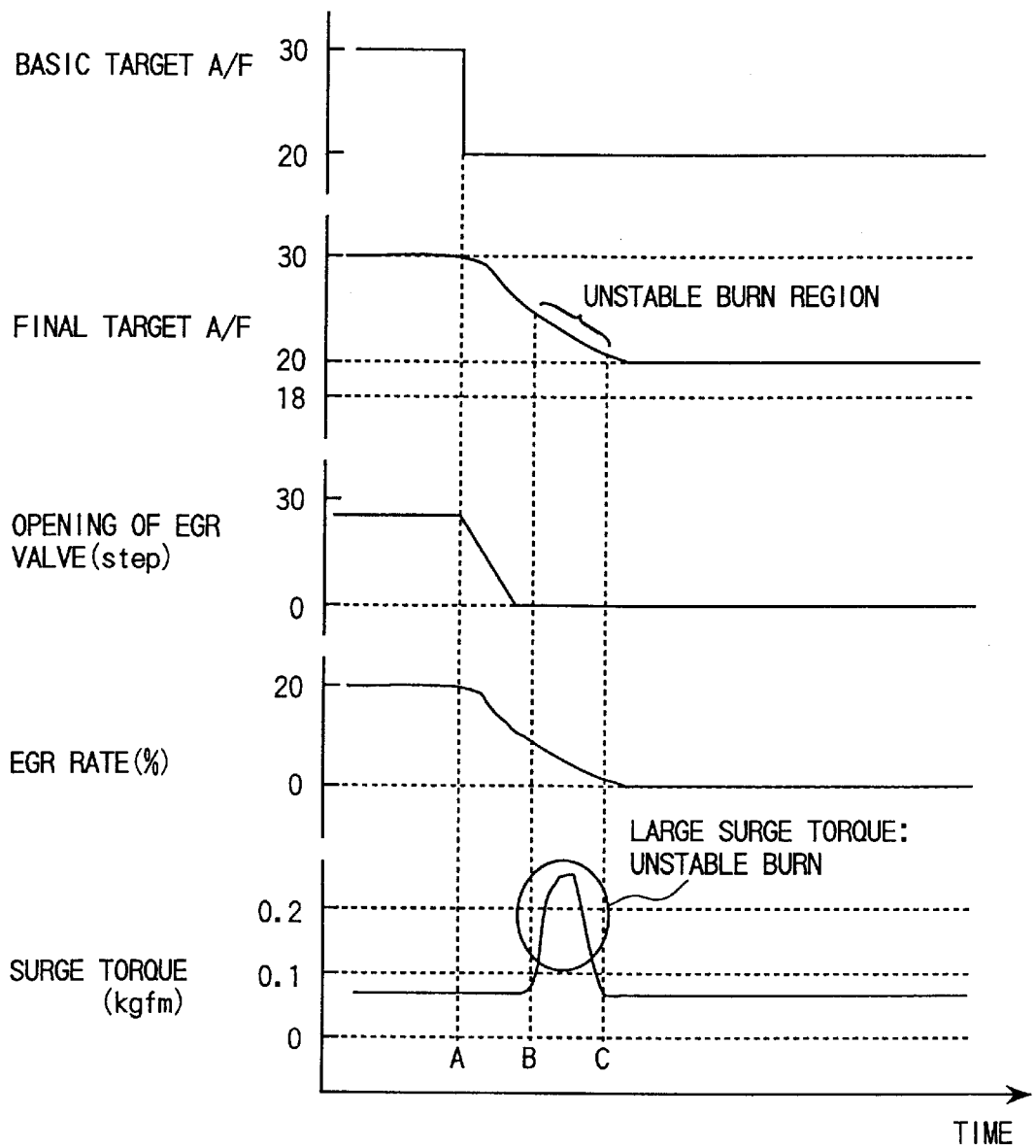
FIG. 21 is a diagram showing the performance of a conventional control apparatus for a direct injection engine.

FIG. 21 shows the performance of an example of a control apparatus similar to a conventional control apparatus in which the three blocks for the target A/F modifying means 104, the target A/F modifying means 105 when switching the burn mode, and the target A/F selecting means 106 are excluded from the composition of the control apparatus of the present invention shown in FIG. 1. In FIG. 21, to begin with, at the time A, the burn mode is switched from the stratified lean burn with EGR in which the A/F is 30 to the homogeneous charge burn in which the A/F is 20. The final target A/F obtained by performing the phase lag operation to the base target A/F is delayed and follows the changed base target A/F. On the other hand, while the EGR valve is closed at the time when the base target A/F is switched from 30 to 20, the EGR valve can not be closed immediately, and it takes a certain amount of time until the EGR gas remaining in an air intake manifold is completely lost. Thus, it is after the time C that the EGR rate becomes 0. In this transitional period, the operational point of the engine passes the instability region shown in FIGS. 3 and 4, and the burn becomes unstable. Consequently, the surge torque of the engine increases, which creates discomfort feelings in driving the car.

Figure 22:
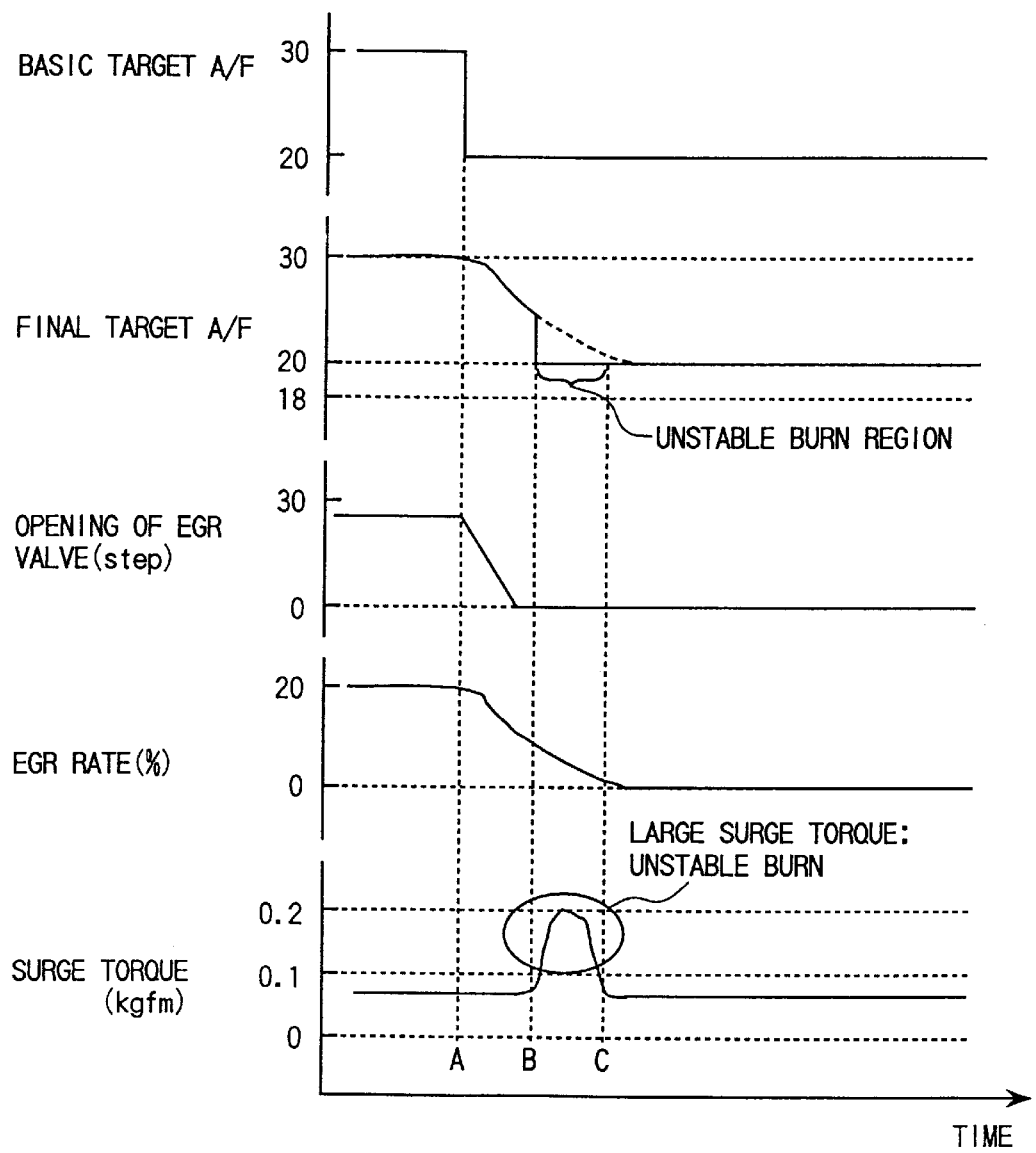
FIG. 22 is a diagram showing the performance of a control apparatus for a direct injection engine in which a part of the present invention is used.

FIG. 22 shows the performance of an example of a control apparatus closer to the control apparatus of the present invention than to a conventional control apparatus in which the two blocks for the target A/F modifying means 105 when switching the burn mode and the target A/F selecting means 106 are excluded from the composition of the control apparatus of the present invention shown in FIG. 1. In FIG. 22, to begin with the time A, the burn mode is switched from the stratified lean burn with EGR in which the A/F is 30 to the homogeneous charge burn in which the A/F is 20. The final target A/F obtained by performing the phase lag operation to the base target A/F is delayed and follows the changed base target A/F. On the other hand, while the EGR valve is closed at the time when the base target A/F is switched from 30 to 20, the EGR valve can not be closed immediately, and it takes a certain amount of time until the EGR gas remaining in an air intake manifold is completely removed. Thus, it is after the time C that the EGR rate becomes 0, similar to the example shown in FIG. 21. In this example, because the limiting operation is performed for the target A/F in the A/F range of point B to point C by the target A/F modifying means 104, the burn state is more stable than in the example shown in FIG. 1. However, because the operational point passes point C' and point D', the surge torque cannot be kept below a required level.

Figure 23:
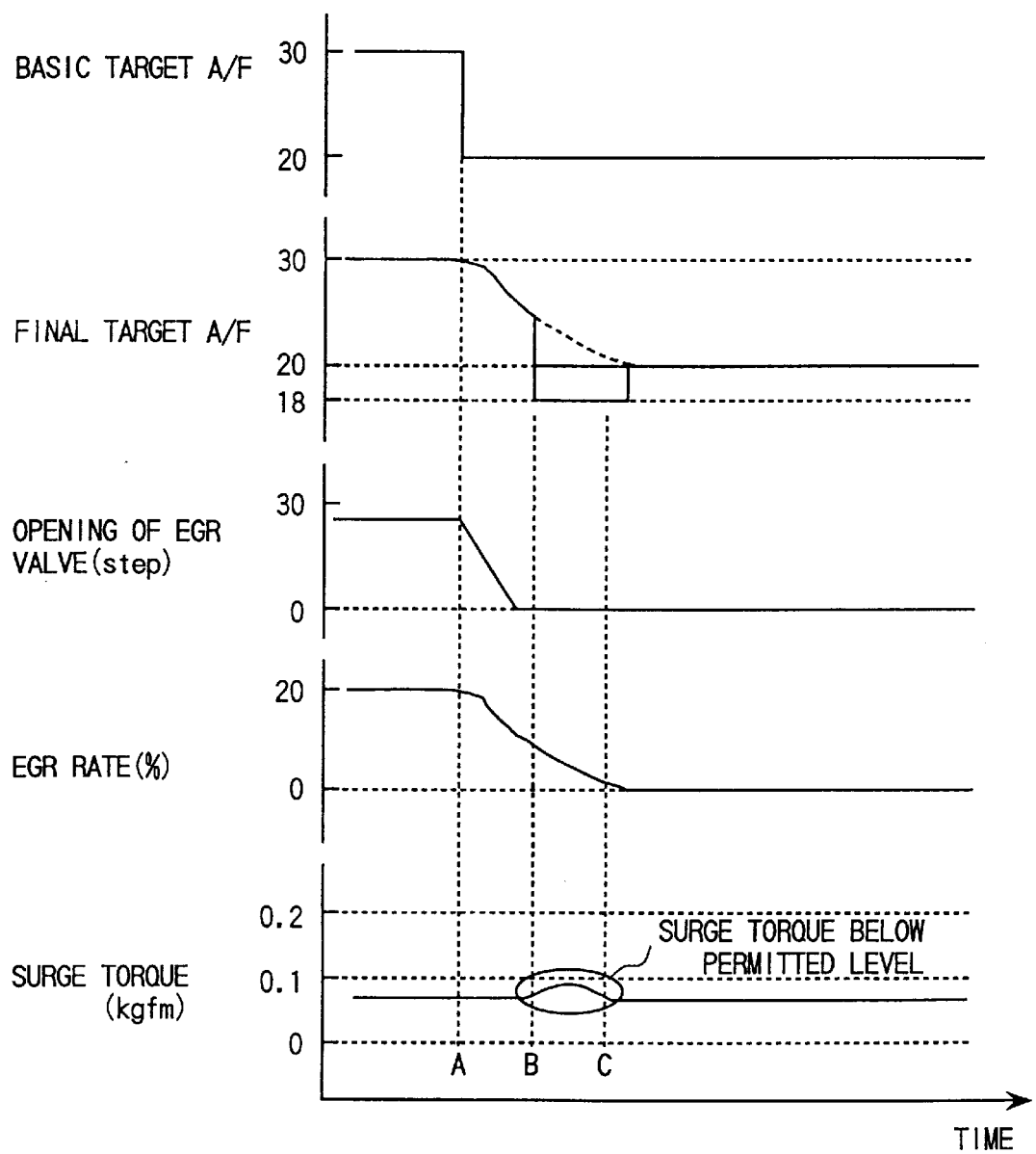
FIG. 23 is a diagram showing the performance of a control apparatus for a direct injection engine according to the present invention.

FIG. 23 shows the performance of the control apparatus of the present invention. In FIG. 23, to begin with the time A, the burn mode is switched from the stratified lean burn with EGR in which the A/F is 30 to the homogeneous charge burn in which the A/F is 20. The final target A/F obtained by performing the phase lag operation to the base target A/F is delayed and follows the changed base target A/F. On the other hand, while the EGR valve is closed at the time when the base target A/F is switched from 30 to 20, the EGR valve can not be closed immediately, and it further takes a definite time until the EGR gas remaining in an air intake manifold is completely removed. Thus, it is after the time C that the EGR rate becomes 0 similarly to the example shown in FIG. 21. In this example, because the limiting operation is performed for the target A/F in the A/F range of point B to point C by the target A/F modifying means 104, the burn state passes the unstable burn region shown in FIG. 3 and FIG. 4. Moreover, because the operational point passes point C and point D, and the surge torque can be kept below a necessary level, driving response and functionality are not degraded by switching the burn mode.

Figure 24:
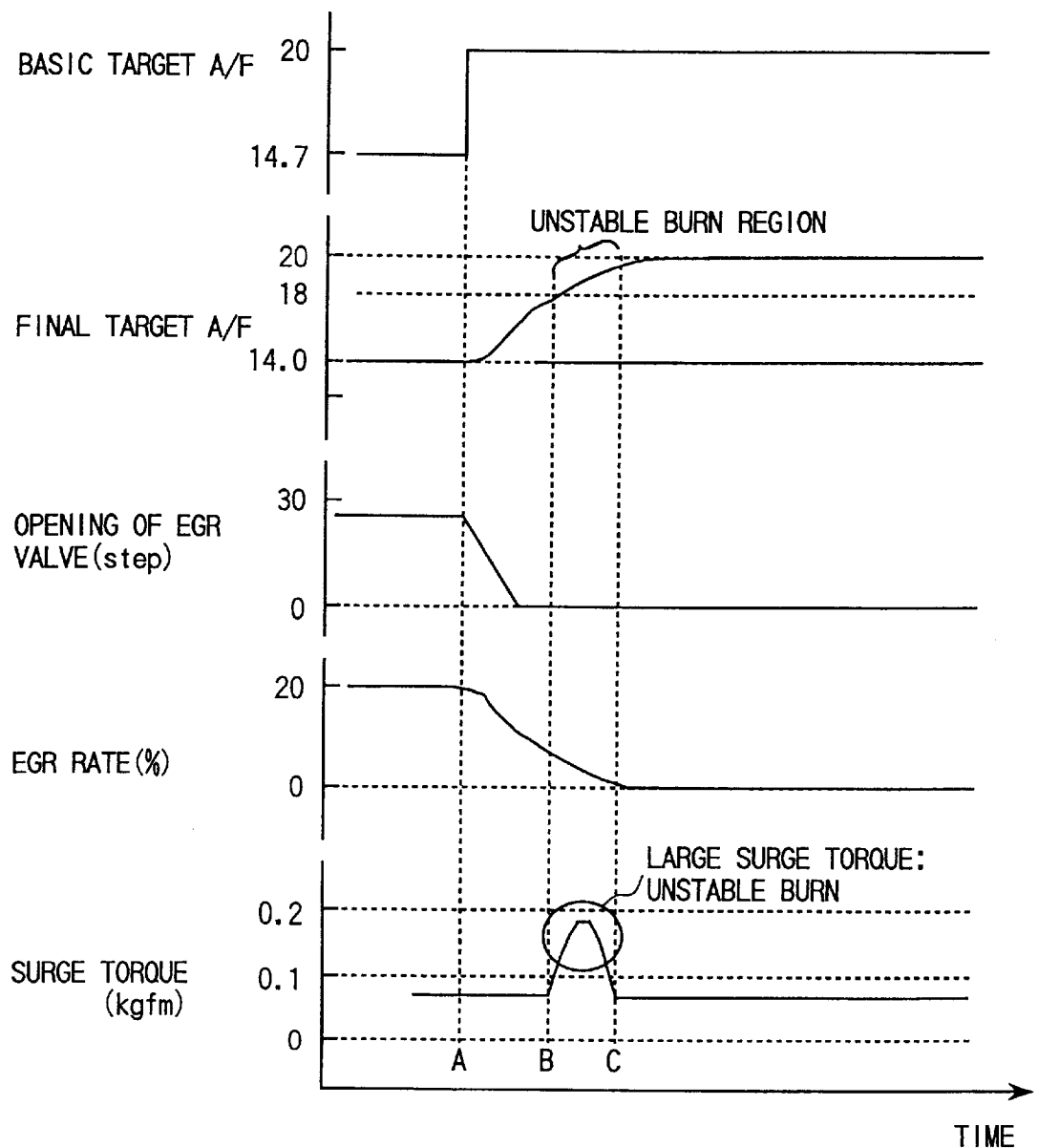
FIG. 24 is a diagram showing the performance of a conventional control apparatus for a direct injection engine when another example of the burn mode switching operation is carried out.
Figure 25:
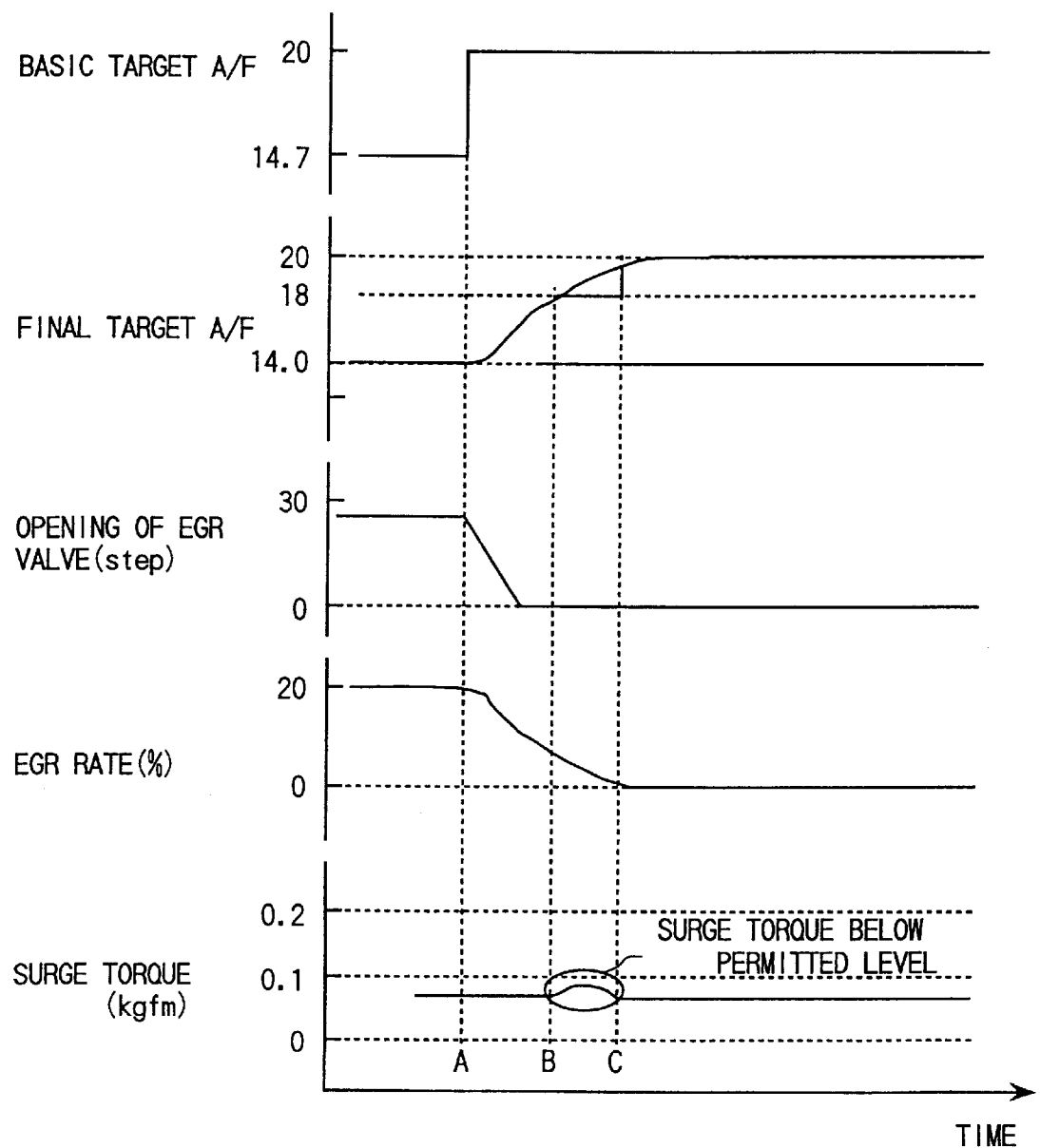
FIG. 25 is a diagram showing the performance of the control apparatus for a direct injection engine according to the present invention when a different example of the burn mode switching operation is carried out.

FIG. 24 and FIG. 25 show the performance of the near-conventional control apparatus and the control apparatus of the present invention when switching the burn mode from the stoichiometric burn to the homogeneous lean burn. The near-conventional control apparatus has the same composition as that of the example explained as for FIG. 21. As shown in FIG. 24, the unstable burn region also appears to switch the burn mode when using this near-conventional control apparatus because the EGR flow cannot be completely stopped immediately. On the other hand, as shown in FIG. 25, the stable burn can be secured even when switching the burn mode from the stoichiometric burn to the homogeneous lean burn by the control apparatus of the present invention because the limiting operation is performed for the target A/F in the A/F range of point B to point C by the first target A/F modifying means 104 and the second target A/F modifying means 104 when switching the burn mode.

As mentioned above, in accordance with the electrical control apparatus for a direct injection engine of the present invention, when the burn mode is switched from the burn with EGR to the burn without EGR, it is possible to avoid unstable burn during the period in which the gas of the EGR remains after the EGR operation is stopped by using the first target A/F modifying means and the second target A/F modifying means when switching the burn mode.

What is claimed is:

1. A control apparatus for a direct injection engine, including an air intake amount measuring means for measuring the amount Qa of intake air taken into each cylinder, an engine rotational speed measuring means for measuring a rotational speed Ne of an engine, a base fuel injection amount calculating means for calculating a base fuel injection pulse width Tp for each cylinder by multiplying the value (Qa/Ne) of said air intake amount Qa divided by said rotational speed Ne by a coefficient such that an air-to-fuel ratio (A/F) of a fuel charge in said cylinder is a stoichiometric ratio (A/F=14.7), a lean charge injection amount calculating means for calculating a lean charge injection pulse width in a lean burn by multiplying said base fuel injection pulse width Tp by an equivalence ratio of said stoichiometric A/F of 14.7 to a lean charge A/F corresponding to said lean charge injection pulse, said control apparatus comprising:

burn mode determining means for determining a stoichiometric burn mode or a lean burn mode, and a stratified charge burn mode or a homogeneous charge burn mode;

target A/F calculating means for calculating a target A/F according to an operational point of said engine;

a phase lag filter for changing the phase of said calculated target A/F;

first target A/F modifying means for modifying said target A/F whose phase is delayed, so that an unstable burn region is avoided;

second target A/F modifying means for further modifying said modified target A/F during a transitional period when the operation is switched so as to avoid said unstable burn region; and target A/F selecting means for selecting one of said modified A/F modified by said first target A/F modifying means and said target A/F modified by said second A/F modifying means.

2. A control apparatus according to claim 1, wherein said second target A/F modifying means sets a target A/F to a richer value than a value to be attained in a homogeneous charge burn for a predetermined period when a burn mode is switched from a stratified charge burn with exhaust gas recirculation (EGR) to homogeneous charge burn without EGR.

3. A control apparatus according to claim 1, wherein said second target A/F modifying means sets a target A/F to a richer value than a value to be attained in a homogeneous lean burn for a predetermined period when a burn mode is switched from a stoichiometric burn with exhaust gas recirculation (EGR) to homogeneous lean burn without EGR.

4. A control apparatus according to one of claims 1–3, wherein said target A/F selecting means selects a target A/F modified by said second target A/F modifying means for a predetermined period when a burn mode is switched from a stratified charge burn with EGR to homogeneous charge burn without EGR.

5. A control apparatus according to one of claims 1–3, wherein said target A/F selecting means selects a target A/F modified by said second target A/F modifying means for a predetermined period when a burn mode is switched from a stoichiometric burn with EGR to homogeneous lean burn without EGR.

6. A control apparatus according to claim 1, wherein said target A/F selecting means determines whether or not a burn mode has been switched, and further determines whether or not a target A/F modified by said second target A/F modifying means should be selected based on information on the state of EGR when a burn mode is switched.

7. A control apparatus according to claim 6, wherein said information on the state of EGR when a burn mode is switched is the opening of an exhaust gas recirculation valve (EGR/V), and if said opening of said EGR/V is more than a predetermined opening, said target A/F selecting means selects a target A/F modified by said second target A/F modifying means.

8. A control apparatus according to claim 6, wherein said information on the state of EGR when a burn mode is switched is the number of steps in the valve opening direction of an EGR/V which is driven by a step-motor, and if said number of steps of said EGR/V is more than a predetermined number, said target A/F selecting means selects a target A/F modified by said second target A/F modifying means.

9. A control apparatus according to claim 6, wherein said information on the state of EGR when a burn mode is switched is the ON-duty ratio for an EGR/V which is driven by a duty control method, and if said ON-duty ratio for said EGR/V is more than a predetermined ratio, said target A/F selecting means selects a target A/F modified by said second target A/F modifying means.

10. A control apparatus according to claim 6, wherein said target A/F selecting means selects a target A/F modified by said second target A/F modifying means for a predetermined period after it is determined that a burn mode has been switched, and a predetermined condition for the operational state of EGR is satisfied.

11. A control apparatus according to claim 10, wherein said predetermined period in which said target A/F selecting means selects a target A/F modified by said second target A/F modifying means is determined by using a function of a signal on the operational state of EGR when a burn mode is switched.

12. A control apparatus according to claim 11, wherein said function of a signal on the operational state of EGR when a burn mode is switched is a function of the opening of an EGR/V, and is expressed by a table of the opening of said EGR/V.

13. A control apparatus according to claim 11, wherein said function of a signal on the operational state of EGR when a burn mode is switched is a function of the number of steps in the valve opening direction of an EGR/V which is driven by a step-motor, and is expressed by a table of the number of steps in the valve opening direction of said EGR/V.

14. A control apparatus according to claim 11, wherein said function of a signal on the operational state of EGR when a burn mode is switched is a function of the ON-duty ratio for an EGR/V which is driven by a duty control method, and is expressed by a table of the ON-duty ratio for said EGR/V.

15. A control apparatus according to claim 11, wherein said function of a signal on the operational state of EGR when a burn mode is switched is a function of the opening of an EGR/V and an intake air amount Qa, and is expressed by a table of the opening of said EGR/V and an intake air amount Qa.

16. A method of controlling an engine system in which an acceleration pedal position and an engine rotational speed are detected, a target air-to-fuel ratio (A/F) is obtained based on the detected acceleration pedal position and engine rotational speed, and an exhaust gas recirculation (EGR) means to recirculate exhaust gas expelled from cylinders is provided and controlled, said method comprises the steps of:

limiting said obtained target A/F to a predetermined value when said obtained A/F reaches the boundary of a region in which a homogeneous charge burn with the operation of EGR is prohibited; and setting said predetermined value to a reset target A/F.

17. A method of controlling an engine system in which an acceleration pedal position and an engine rotational speed are detected, a target air-to-fuel ratio (A/F) is obtained based on the detected acceleration pedal position and engine rotational speed, and an exhaust gas recirculation (EGR) means to recirculate exhaust gas expelled from cylinders is provided and controlled, said method comprises the step of:

limiting said obtained target A/F to a predetermined value when a burn mode in each cylinder is switched from a stratified charge burn with EGR to a homogeneous charge burn; and setting said predetermined value to a reset target A/F.

18. A method of controlling an engine system in which an acceleration pedal position and an engine rotational speed are detected, a target air-to-fuel ratio (A/F) is obtained based on the detected acceleration pedal position and engine rotational speed, and an exhaust gas recirculation (EGR) means to recirculate exhaust gas expelled from cylinders is provided and controlled, said method comprises the step of:

limiting said obtained target A/F to a predetermined value when a target A/F is switched from an A/F value to be set in a stoichiometric burn with EGR to an A/F value to be set in a homogeneous charge burn; and setting said predetermined value to a reset target A/F.

19. A control apparatus for an engine including means for detecting an acceleration pedal position and an engine rotational speed, means for obtaining a target air-to-fuel ratio (A/F) based on the detected acceleration pedal position and engine rotational speed, and an exhaust gas recirculation (EGR) means to recirculate and control exhaust gas expelled from cylinders, said control apparatus comprising:

means for switching the burn state in each cylinder between a stratified charge burn with EGR and a homogeneous charge burn without EGR; and means for controlling a target A/F so that the surge torque does not exceed a predetermined value.

20. A control apparatus according to claim 19, wherein said predetermined value is substantially 0.1 kgfm.

* * * * *